United States Patent
Umetsu et al.

(10) Patent No.: US 12,366,518 B2
(45) Date of Patent: Jul. 22, 2025

(54) PARTICLE ANALYSIS SYSTEM AND PARTICLE ANALYSIS METHOD

(71) Applicant: SONY GROUP CORPORATION, Tokyo (JP)

(72) Inventors: Tomoyuki Umetsu, Tokyo (JP); Naoki Ide, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/905,545

(22) PCT Filed: Feb. 16, 2021

(86) PCT No.: PCT/JP2021/005679
§ 371 (c)(1),
(2) Date: Sep. 2, 2022

(87) PCT Pub. No.: WO2021/182031
PCT Pub. Date: Sep. 16, 2021

(65) Prior Publication Data
US 2024/0201066 A1 Jun. 20, 2024

(30) Foreign Application Priority Data
Mar. 13, 2020 (JP) .................... 2020-044118

(51) Int. Cl.
*G01N 15/1434* (2024.01)
*G01N 15/01* (2024.01)
(Continued)

(52) U.S. Cl.
CPC ......... *G01N 15/1434* (2013.01); *G01N 15/01* (2024.01); *G01N 15/149* (2024.01); *G01N 2015/1006* (2013.01)

(58) Field of Classification Search
None
See application file for complete search history.

(56) References Cited

U.S. PATENT DOCUMENTS 6,015,667 A * 1/2000 Sharaf ............... G01N 30/8665
435/91.2
7,280,204 B2 * 10/2007 Robinson ........... G01N 15/1459
356/306
(Continued)

FOREIGN PATENT DOCUMENTS

EP 2383554 A1 * 11/2011 ......... G01N 21/6428
JP 2011-232259 A 11/2011
(Continued)

OTHER PUBLICATIONS

International Search Report and Written Opinion of PCT Application No. PCT/JP2021/005679, issued on May 11, 2021, 09 pages of ISRWO.

*Primary Examiner* — David P Porta
*Assistant Examiner* — Djura Malevic
(74) *Attorney, Agent, or Firm* — CHIP LAW GROUP

(57) ABSTRACT

A measurement spectrum obtained by irradiating a particle labeled with a plurality of fluorescent dyes with excitation light is separated for each fluorescent dye with high accuracy. Provided is a particle analysis system (1) including a plurality of photodetectors (23) configured to acquire light generated by irradiating a particle labeled with a plurality of fluorescent dyes with excitation light; and an information processing unit (132) configured to calculate fluorescence intensity of each fluorescent dye by performing separation processing on a measurement spectrum based on measured values from the plurality of photodetectors (23) with a single staining spectrum of each fluorescent dye, in which the separation processing is performed by using a weighted least squares method (WLSM) including a weight determined based on a variation in the measured values.

9 Claims, 13 Drawing Sheets

(51) Int. Cl.
  *G01N 15/10*  (2024.01)
  *G01N 15/149*  (2024.01)

(56) References Cited

U.S. PATENT DOCUMENTS

| | | | | |
|---|---|---|---|---|
| 7,283,684 | B1* | 10/2007 | Keenan | G06V 10/52 |
| | | | | 382/277 |
| 8,045,153 | B2* | 10/2011 | Mimura | G01N 21/6458 |
| | | | | 382/167 |
| 8,581,210 | B2* | 11/2013 | Sakai | G01N 15/1429 |
| | | | | 250/459.1 |
| 8,825,431 | B2* | 9/2014 | Kato | G01N 21/6428 |
| | | | | 702/179 |
| 10,656,090 | B2* | 5/2020 | Kato | G01N 21/6428 |
| 11,009,400 | B2* | 5/2021 | Mage | G01N 21/6486 |
| 11,169,076 | B2* | 11/2021 | Yan | G01N 21/47 |
| 11,187,584 | B2* | 11/2021 | Yamamoto | G01N 15/1459 |
| 11,262,305 | B2* | 3/2022 | Kato | G01N 21/6428 |
| 11,480,513 | B2* | 10/2022 | Umetsu | G01N 15/1434 |
| 11,543,295 | B2* | 1/2023 | Mage | G01J 3/4406 |
| 11,561,161 | B2* | 1/2023 | Yoshioka | G01N 15/1429 |
| 11,761,895 | B2* | 9/2023 | Ikeda | G01N 21/6458 |
| | | | | 348/79 |
| 11,781,963 | B2* | 10/2023 | Ilkov | G01N 15/1012 |
| | | | | 250/552 |
| 12,038,326 | B2* | 7/2024 | Mage | G01N 15/1459 |
| 2009/0012721 | A1* | 1/2009 | Kimura | G01N 21/274 |
| | | | | 702/23 |
| 2009/0080722 | A1* | 3/2009 | Okugawa | G01N 21/274 |
| | | | | 382/128 |
| 2009/0128806 | A1* | 5/2009 | Mimura | G01N 21/6458 |
| | | | | 356/317 |
| 2010/0041065 | A1* | 2/2010 | Horii | G01N 21/648 |
| | | | | 435/7.1 |
| 2010/0120059 | A1* | 5/2010 | Yan | G01N 21/6486 |
| | | | | 435/7.1 |
| 2012/0016616 | A1* | 1/2012 | Kato | G01N 21/6428 |
| | | | | 702/189 |
| 2012/0056103 | A1* | 3/2012 | Sakai | G01N 21/64 |
| | | | | 250/459.1 |
| 2013/0026391 | A1* | 1/2013 | Sekino | G01N 21/6458 |
| | | | | 702/181 |
| 2013/0065269 | A1* | 3/2013 | Nitta | G01N 21/274 |
| | | | | 250/200 |
| 2013/0346023 | A1* | 12/2013 | Novo | G01N 15/1429 |
| | | | | 702/179 |
| 2014/0365159 | A1* | 12/2014 | Kato | G01N 21/6428 |
| | | | | 702/189 |
| 2016/0011095 | A1* | 1/2016 | Muraki | G01N 21/6486 |
| | | | | 250/216 |
| 2016/0033387 | A1* | 2/2016 | Malachowski | G01N 15/1429 |
| | | | | 702/22 |
| 2017/0140299 | A1* | 5/2017 | Tanji | G06N 20/00 |
| 2018/0259440 | A1* | 9/2018 | Otsuka | G01N 15/14 |
| 2019/0011348 | A1* | 1/2019 | Tahara | G01N 15/1012 |
| 2019/0137383 | A1* | 5/2019 | Umetsu | G01N 15/1459 |
| 2020/0124520 | A1* | 4/2020 | Yamane | G01N 15/1429 |
| 2020/0182772 | A1* | 6/2020 | Umetsu | G01N 15/1434 |
| 2021/0396675 | A1* | 12/2021 | Ikeda | G01N 21/6428 |
| 2022/0107271 | A1* | 4/2022 | Hara | G01N 15/147 |
| 2022/0260491 | A1* | 8/2022 | Kato | G01N 21/6428 |
| 2022/0276148 | A1* | 9/2022 | Yamane | G01N 15/1456 |
| 2022/0317019 | A1* | 10/2022 | Yamauchi | G01N 21/6402 |
| 2022/0381671 | A1* | 12/2022 | Nishimaki | G16H 10/40 |
| 2023/0092756 | A1* | 3/2023 | Ide | G01N 33/582 |
| | | | | 703/2 |
| 2023/0144616 | A1* | 5/2023 | Taki | A61M 15/0003 |
| | | | | 706/12 |
| 2023/0168195 | A1* | 6/2023 | Futamura | G01N 15/1459 |
| | | | | 250/458.1 |
| 2023/0243839 | A1* | 8/2023 | Goto | G06T 5/50 |
| | | | | 436/172 |
| 2023/0296492 | A1* | 9/2023 | Yanashita | G06N 3/08 |
| | | | | 702/25 |
| 2024/0027348 | A1* | 1/2024 | Ikeda | G06V 10/60 |
| 2024/0159673 | A1* | 5/2024 | Kato | G01N 21/6428 |
| 2024/0201066 | A1* | 6/2024 | Umetsu | G01N 15/1434 |
| 2024/0230506 | A1* | 7/2024 | Tahara | G01N 15/1434 |
| 2024/0280468 | A1* | 8/2024 | Tahara | G01N 15/1459 |
| 2024/0288354 | A1* | 8/2024 | Yamamoto | G01N 15/1459 |

FOREIGN PATENT DOCUMENTS

| | | |
|---|---|---|
| WO | 2007/097171 A1 | 8/2007 |
| WO | 2018/198586 A1 | 11/2018 |
| WO | 2019/049442 A1 | 3/2019 |
| WO | 2019/230878 A1 | 12/2019 |

* cited by examiner

FLUORESCENT DYE A

FLUORESCENT DYE B

FLUORESCENT DYE C

FLUORESCENT DYE D

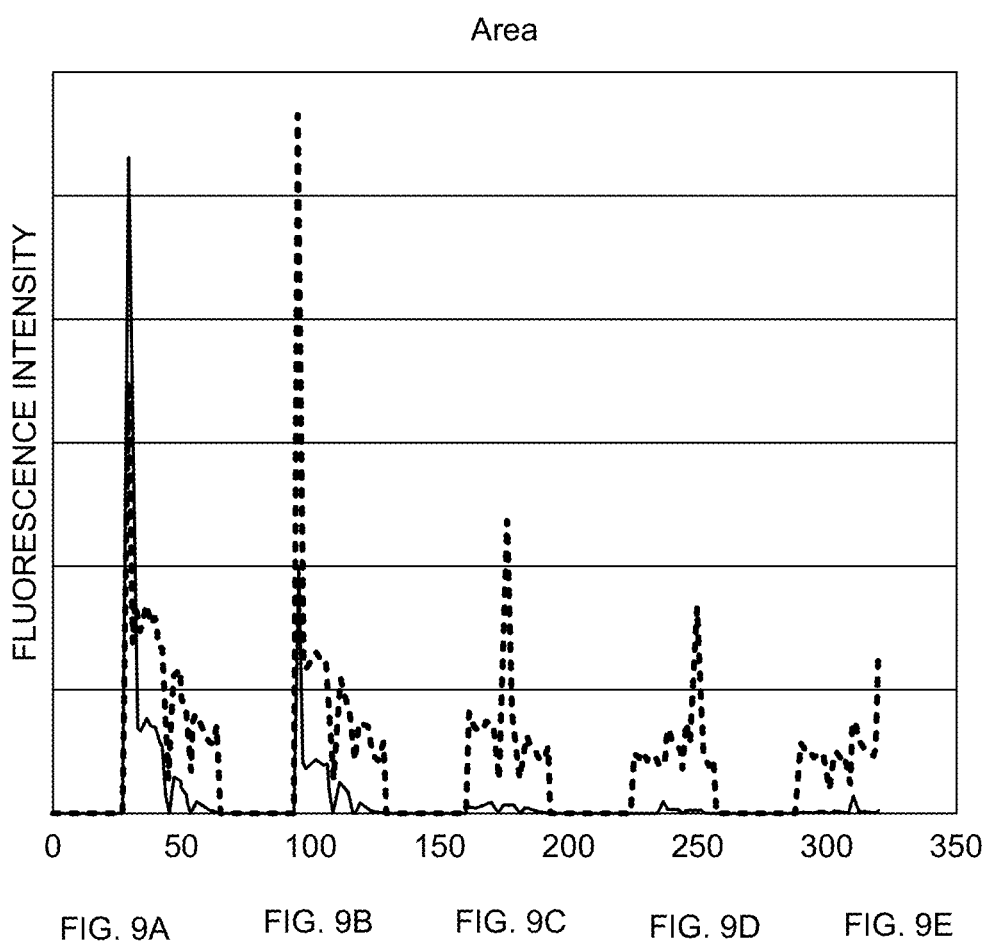

1

PARTICLE ANALYSIS SYSTEM AND PARTICLE ANALYSIS METHOD

CROSS REFERENCE TO RELATED APPLICATIONS

This application is a U.S. National Phase of International Patent Application No. PCT/JP2021/005679 filed on Feb. 16, 2021, which claims priority benefit of Japanese Patent Application No. JP 2020-044118 filed in the Japan Patent Office on Mar. 13, 2020. Each of the above-referenced applications is hereby incorporated herein by reference in its entirety.

FIELD

The present invention relates to a particle analysis system and a particle analysis method.

BACKGROUND

In order to analyze a characteristic of a microparticle such as a cell, a microorganism, and a liposome, a technique is used in which excitation light such as laser light is emitted to a microparticle labeled with a fluorescent dye to measure a fluorescence intensity and spectrum of fluorescence generated from the fluorescent dye. An example of this technique is a flow cytometer. In the flow cytometer, a microparticle flowing in a flow path is irradiated with excitation light, and fluorescence, scattered light, and the like emitted from the microparticle are detected by a plurality of photodetectors (for example, PMT: photo multiplier tube) and the like. In recent years, in order to analyze the characteristic of the microparticle in more detail, a technique of analyzing a microparticle labeled with a plurality of fluorescent dyes has been used.

However, when labeling is performed by using a plurality of fluorescent dyes, center wavelengths of fluorescences generated from the respective fluorescent dyes may be close to each other. In this case, there may be a wavelength band in which fluorescence spectra overlap. In the wavelength band in which fluorescence spectra are overlapped, fluorescence from each fluorescent dye cannot be appropriately separated, and thus, fluorescence other than fluorescence from a target fluorescent dye may leak into each photodetector. When this leakage of fluorescence occurs, since the fluorescence intensity is measured to be larger than an actual fluorescence intensity, an error may occur in the fluorescence intensity.

In order to correct this error in the fluorescence intensity, a technique is known in which a measurement spectrum measured by a photodetector is mathematically separated by using a spectrum (single staining spectrum) of each fluorescent dye to calculate the fluorescence intensity from each fluorescent dye with high accuracy.

CITATION LIST

Patent Literature

Patent Literature 1: JP 2011-232259 A

SUMMARY

Technical Problem

However, in a conventional technique, it may be difficult to separate the measurement spectrum measured by the photodetector for each fluorescent dye with high accuracy.

The present application has been made in view of the above, and proposes a particle analysis system capable of separating a measurement spectrum obtained by irradiating a particle labeled with a plurality of fluorescent dyes with excitation light for each fluorescent dye with high accuracy and a particle analysis method.

Solution to Problem

A particle analysis system according to the present disclosure includes: a plurality of photodetectors configured to acquire light generated by irradiating a particle labeled with a plurality of fluorescent dyes with excitation light; and an information processing unit configured to calculate fluorescence intensity of each fluorescent dye by performing separation processing on a measurement spectrum based on measured values from the plurality of photodetectors with a single staining spectrum of each fluorescent dye, wherein the separation processing is performed by using a weighted least squares method (WLSM) including a weight determined based on a variation in the measured values.

BRIEF DESCRIPTION OF DRAWINGS

FIGS. 9A, 9B, 9C, 9D, and 9E are diagrams illustrating an example of an area-based variation according to an embodiment.

DESCRIPTION OF EMBODIMENTS

Figure 1:
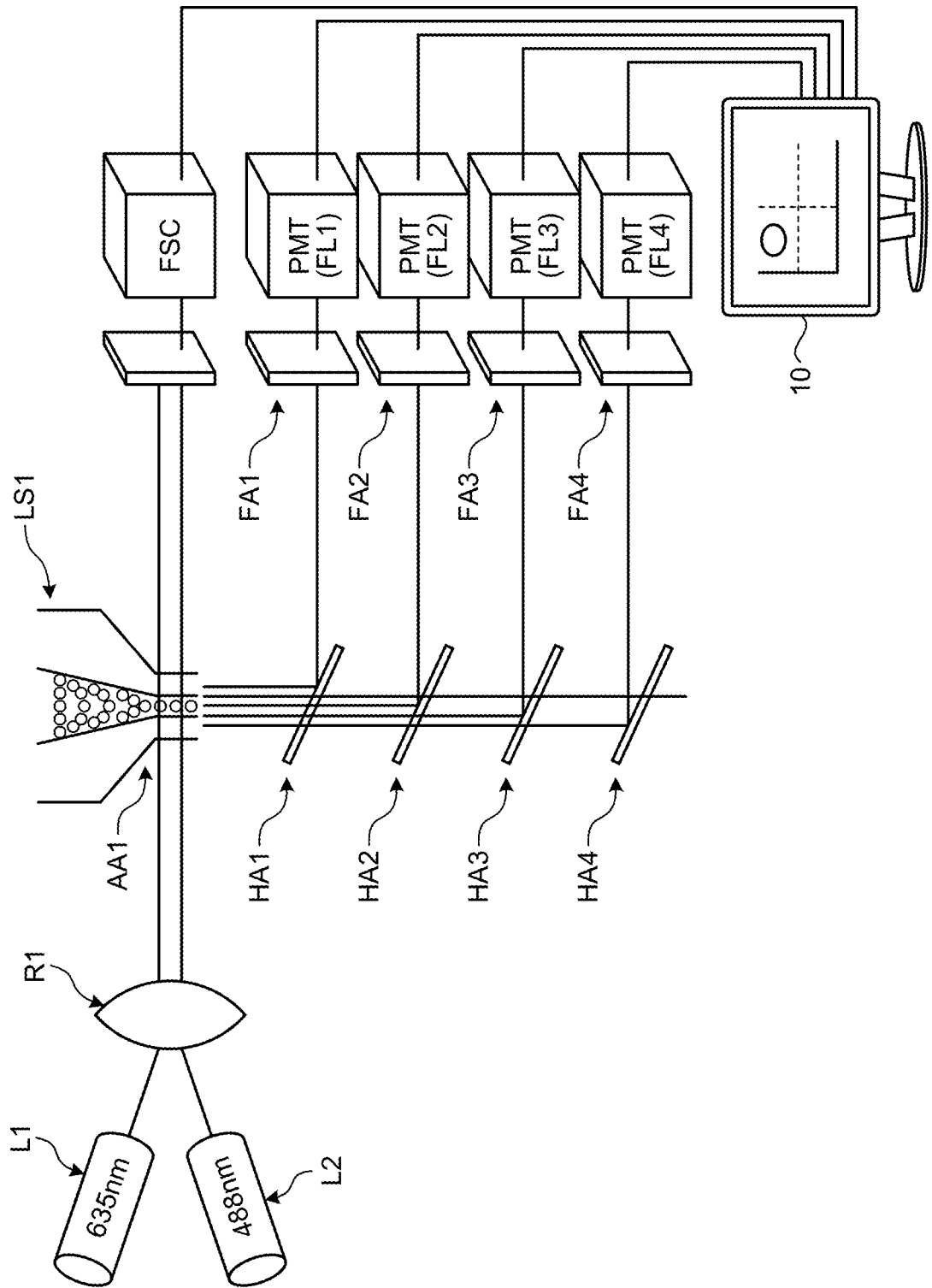
FIG. 1 is a diagram illustrating fluorescence detection of a flow cytometer.

Hereinafter, modes for carrying out the particle analysis system and the particle analysis method according to the present application (hereinafter, referred to as "embodiment") will be described in detail with reference to the drawings. Note that the particle analysis system and the particle analysis method according to the present application are not limited by this embodiment. In the following embodiments, the same parts are denoted by the same reference numerals, and redundant description will be omitted.

The present disclosure will be described according to the following order of items.
1. Fluorescence detection by flow cytometer
2. Configuration of system according to embodiment
3. Example of information processing
3.1. Information processing apparatus 100
3.2. Processing procedure
4. Modifications
5. Variations of processing
5.1. Application to hole slide imaging (WSI)
5.2. Measurement of various spectra
5.3. Spectral object other than prism
5.4. Integral of apparatus
5.5. Other signals
6. Hardware configuration
7. Others

EMBODIMENT

1. Fluorescence Detection by Flow Cytometer

Fluorescence detection in a flow cytometer includes a method in which a light intensity in a continuous wavelength band is acquired in addition to a method in which a user selects an optical system corresponding to a fluorescence wavelength of a fluorescent dye labeled a particle and measures a fluorescence intensity of each fluorescent dye. Each method will be described below.

FIG. 1 illustrates a method for measuring a fluorescence intensity for each fluorescent dye. In the method illustrated in FIG. 1, in a part AA1 of a flow path LS1 through which a particle flows, the particle is irradiated with two excitation lights (635 nm and 488 nm) having different wavelengths. When the particle is irradiated with excitation light, the fluorescent dye emits fluorescence. The fluorescence generated from the fluorescent dye is dispersed by dichroic mirrors HA1 to HA4 that reflect fluorescence of a wavelength in a specific band, passes through band filters FA1 to FA4, thereby acquiring a fluorescence intensity in a wavelength band corresponding to the fluorescence wavelength of each fluorescent dye by each of PMT FL1 to FL4. In the method illustrated in FIG. 1, when center wavelengths of the fluorescences generated from the respective fluorescent dyes are close to each other, the fluorescences overlap each other, and thus it is difficult to completely suppress leakage other than the fluorescence from a target fluorescent dye.

Figure 2:
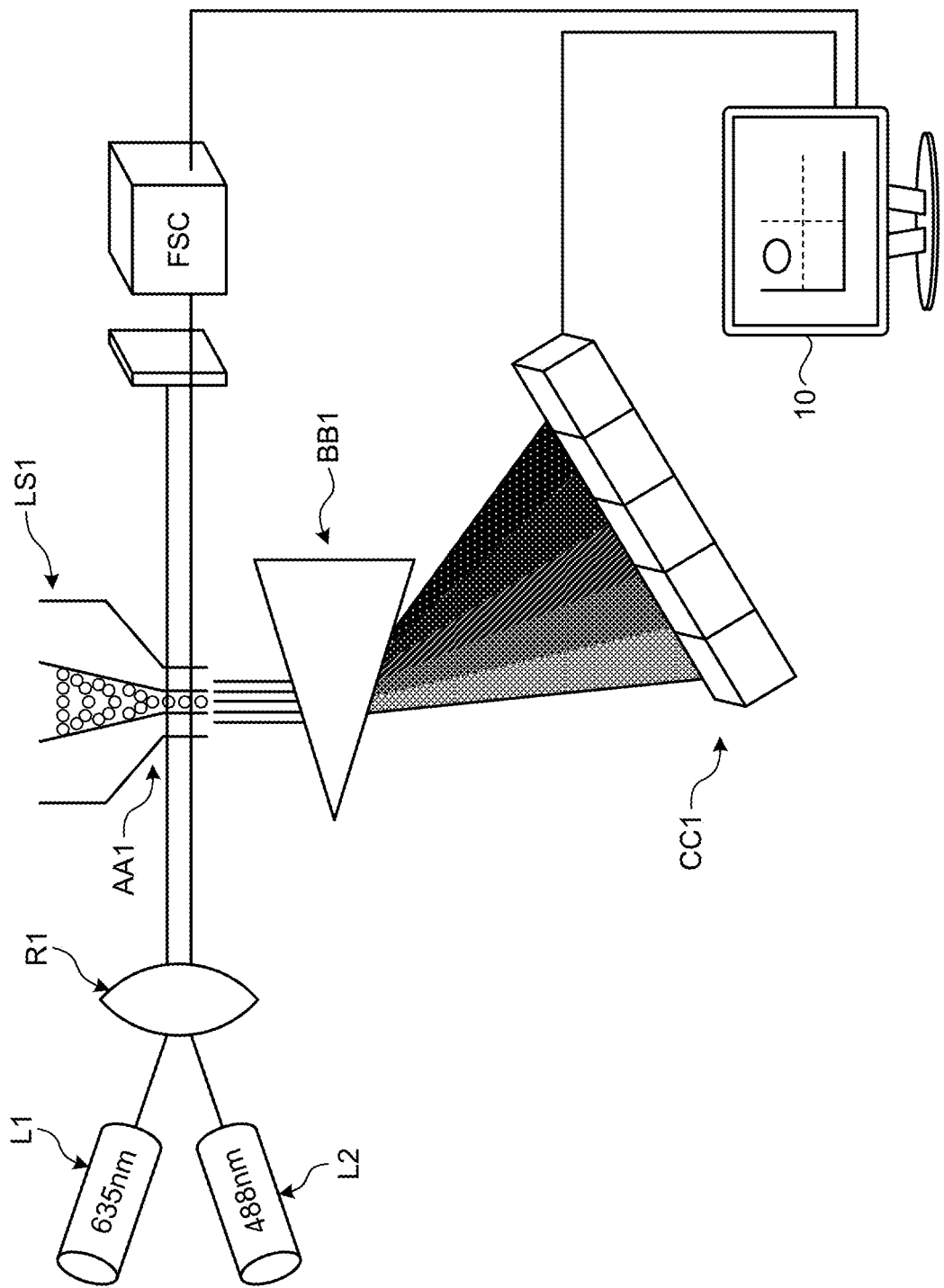
FIG. 2 is a diagram illustrating fluorescence detection of a spectral-type flow cytometer.

FIG. 2 illustrates a method of measuring an intensity of light in a continuous wavelength band. In FIG. 2, the light generated by irradiating a particle labeled with a plurality of fluorescent dyes with excitation light is directed to a prism BB1. In FIG. 2, light is dispersed by using the prism BB1. A plurality of photodetectors CC1 acquire the intensities of the light dispersed by the prism BB1 for each wavelength band. Here, the means for dispersing light is not limited to the prism BB1, and may be a diffraction grating. In addition, an optical system that transmits or reflects light according to a wavelength, such as a dichroic mirror and a beam splitter, may be used. By disposing an optical system such as a dichroic mirror or a beam splitter on a light receiving surface side of each of the plurality of photodetectors, it is possible to acquire the intensity of each wavelength band of light. The fluorescence intensity of each fluorescent dye can be acquired by performing mathematical separation processing (unmixing processing) on a detection value for each wavelength band acquired by the above method. This makes it possible to suppress leakage of fluorescence other than fluorescence from a target fluorescent dye even when the center wavelengths of fluorescences generated from the respective fluorescent dyes are close to each other. The flow cytometer as illustrated in FIG. 2 may be referred to as a "spectral-type flow cytometer".

2. Configuration of System According to Embodiment

Figure 3:
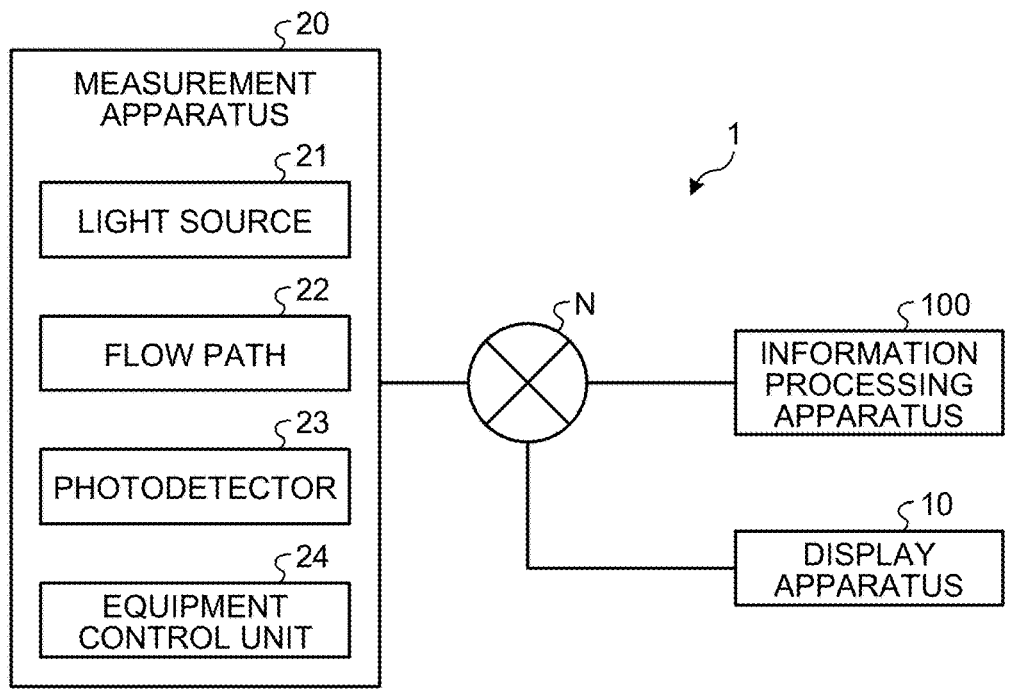
FIG. 3 is a diagram illustrating a particle analysis system 1 according to an embodiment.

A particle analysis system 1 according to the embodiment will be described with reference to FIG. 3. FIG. 3 is a diagram illustrating the particle analysis system 1 according to the embodiment. As illustrated in FIG. 3, the particle analysis system 1 includes a display apparatus 10, a measurement apparatus 20, and an information processing apparatus 100.

The display apparatus 10 has a screen using, for example, liquid crystal, electro-luminescence (EL), cathode ray tube (CRT), or the like. The display apparatus 10 may be compatible with 4K or 8K, or may be formed by a plurality of display apparatuses. The display apparatus 10 displays the intensity of the fluorescence or the like (for example, fluorescence, phosphorescence, or scattered light) detected by the measurement apparatus 20 as a spectrum (hereinafter, it is appropriately referred to as a "measurement spectrum").

A spectral-type flow cytometer may be used as the measurement apparatus 20. The measurement apparatus 20 is used to irradiate a particle labeled with a plurality of fluorescent dyes with excitation light and detect the intensity of fluorescence or the like generated from each fluorescent dye. As illustrated in FIG. 3, the measurement apparatus 20 includes a light source 21, a flow path 22, a photodetector 23, and an equipment control unit 24.

Figure 4:
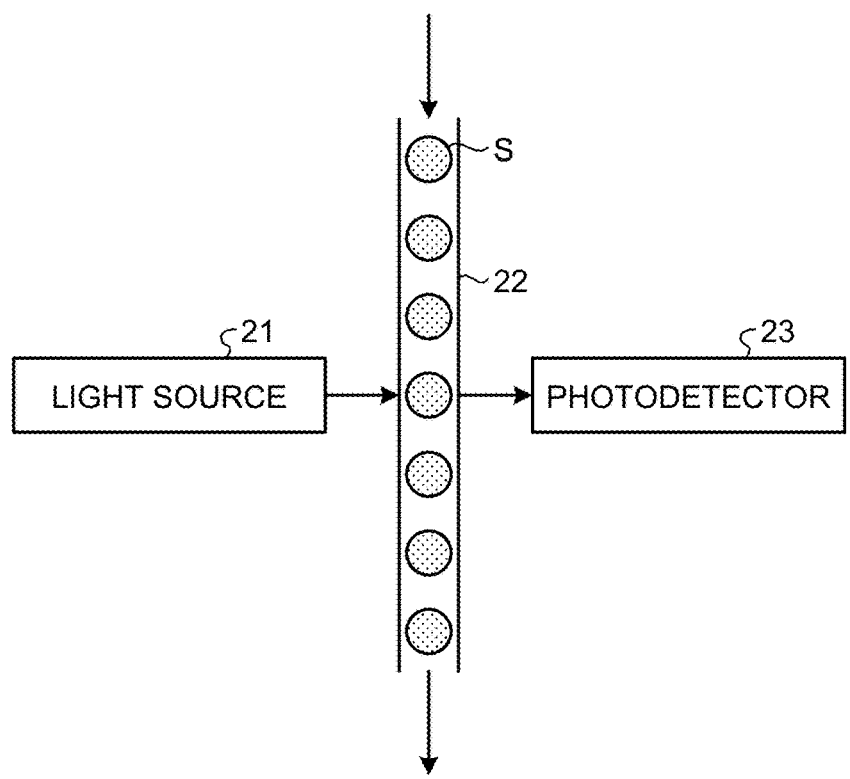
FIG. 4 is a diagram illustrating a schematic configuration of a flow cytometer.

Referring to FIG. 4, in the flow cytometer, a particle S flowing through the flow path 22 is irradiated with the excitation light from the light source 21. The photodetector 23 detects fluorescence emitted from the particle S irradiated with the excitation light, scattered light scattered by the particle S, and the like. Although not illustrated in FIG. 4, an optical system such as a lens for guiding excitation light to the particle S and an optical system for guiding fluorescence or the like generated from the particle S to the photodetector 23 are provided in the flow cytometer.

The particle S is, for example, a biologically derived particle such as a cell, a microorganism, and a biologically relevant particle, and includes a population of a plurality of biologically derived particles. The particle S may be, for example, a biologically derived microparticle such as a cell such as an animal cell (for example, blood cells and the like) and a plant cell, a bacterium such as *Escherichia coli*, a virus such as tobacco mosaic virus, a microorganism such as a fungus such as yeast, a biologically related particle configuring a cell such as a chromosome, a liposome, a mitochondria, an exosome, and various organelles (organelles), or a biologically related polymer such as a nucleic acid, a protein, a lipid, a sugar chain, and a complex thereof. Furthermore, the particle S widely includes a synthetic particle such as a latex particle, a gel particle, and an industrial particle. In addition, the industrial particle may be, for example, an organic or inorganic polymer material, a metal, or the like. Examples of the organic polymer material include polystyrene, styrene-divinylbenzene, polymethyl methacrylate, and the like. Examples of the inorganic polymer material include glass, silica, a magnetic material, and the like. The metal includes gold colloid, aluminum, and the like. The shape of these particles is generally spherical, but may be non-spherical, and the size, mass, and the like are not particularly limited.

Here, the particle S is labeled (stained) with one or more fluorescent dyes. The labeling of the particle S with the fluorescent dye can be performed by a known method. For example, when the particle S is a cell, a fluorescently labeled antibody that selectively binds to an antigen present on a cell surface is mixed with a cell to be measured, and the fluorescently labeled antibody is bound to the antigen on the cell surface, whereby the cell to be measured can be labeled with a fluorescent dye.

The fluorescently labeled antibody is an antibody to which a fluorescent dye is bound as a label. Specifically, the fluorescently labeled antibody may be obtained by binding a fluorescent dye to which avidin is bound to a biotin-labeled antibody by an avidin-biotin reaction. Alternatively, the fluorescently labeled antibody may be an antibody to which a fluorescent dye is directly bound. As the antibody, either a polyclonal antibody or a monoclonal antibody can be used. In addition, the fluorescent dye for labeling a cell is also not particularly limited, and it is possible to use at least one or more known dyes used for staining a cell and the like.

Figure 5:
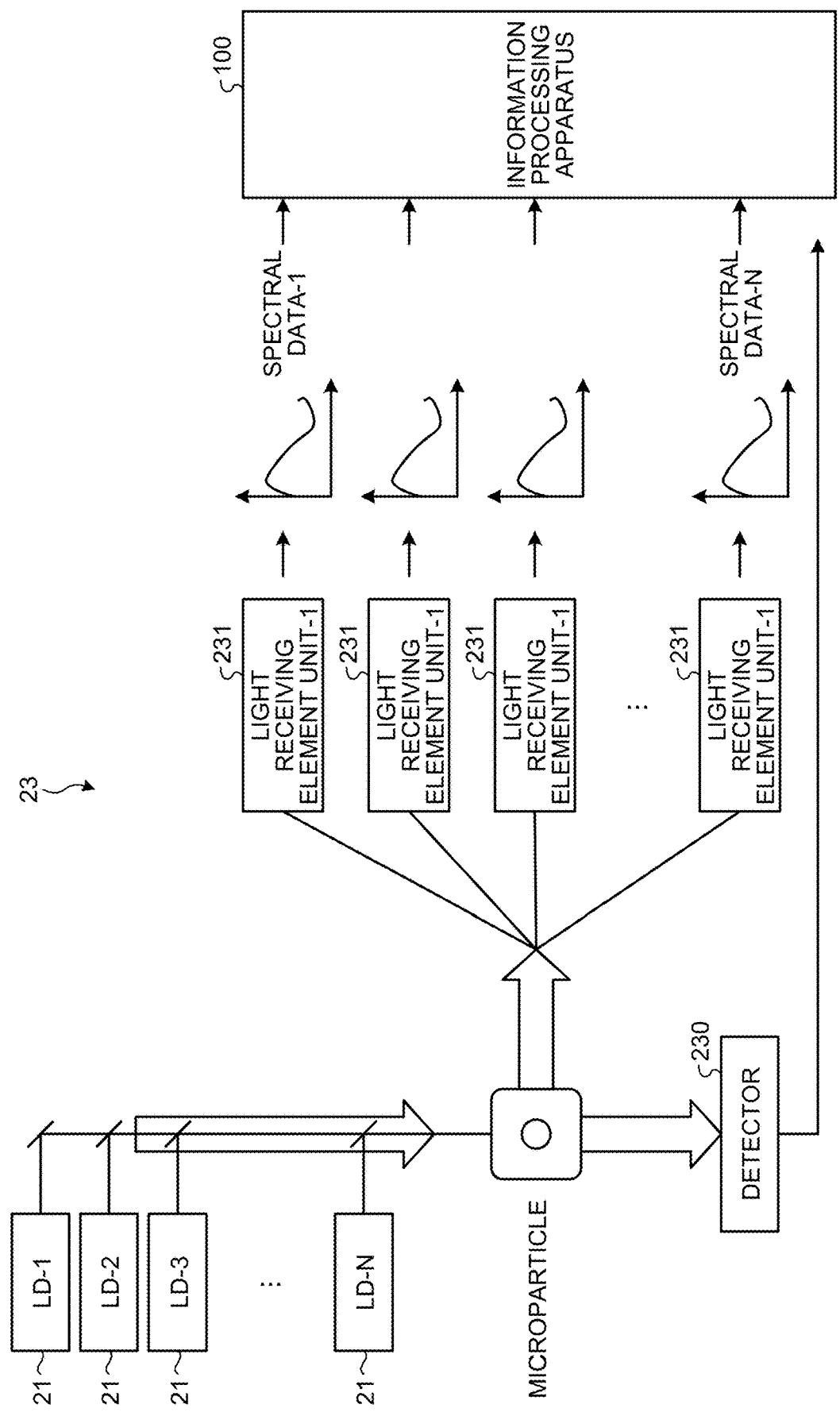
FIG. 5 is a diagram illustrating an example of a configuration of a flow cytometer.

The light source 21 is a light source that emits excitation light having a predetermined wavelength. In FIGS. 1 and 2, the light source 21 emits excitation light having wavelengths of 488 nm and 635 nm. In addition, FIG. 3 illustrates a case where the measurement apparatus 20 includes one light source 21, but the measurement apparatus 20 may include a plurality of light sources 21. FIG. 5 illustratesN(N is a positive integer) light sources 21 represented by LD-1 to LD-N. N is, for example, 7 or 5. The N light sources 21 irradiate the particle with excitation light on different axes.

The flow path 22 is a micro flow path for circulating particles flowing in the flow path in a line in a flow direction. The flow path 22 may be provided in a microchip or a flow cell.

The photodetector 23 is a photodetector for detecting light generated by irradiating a particle labeled with a fluorescent dye with excitation light. The photodetector 23 detects light of different wavelength bands by each photodetector using a plurality of photodetectors. Here, the wavelength band of the light detected by each photodetector is desirably continuous within a specific wavelength band, but a part of the wavelength band may be missing. In addition, the wavelength bands of the light detected by the respective photodetectors may partially overlap.

As illustrated in FIG. 5, the photodetector 23 includes a detector 230 and N light receiving element units 231.

The detector 230 detects forward scattered light generated by irradiating the particle with excitation light. The detector 230 is realized by, for example, a charge coupled device (CCD), a complementary metal oxide semiconductor (CMOS), a photodiode, or the like. The measured value of the forward scattered light detected by the detector 230 is output to the information processing apparatus 100 according to the present embodiment.

The light receiving element unit 231 detects light generated by irradiating the particle with excitation light. Each light receiving element unit 231 detects light generated by irradiation of excitation light by the corresponding light source 21. The light receiving element unit 231 may be, for example, a light receiving element array in which a plurality of photo multiplier tubes (PMTs) or photodiodes having different wavelength regions to be detected are arranged one-dimensionally or the like, an image sensor in which pixels are arranged in a two-dimensional lattice pattern, or the like. The light receiving element array photoelectrically converts fluorescence from the particle dispersed for each wavelength by a spectroscopic element such as a prism or a grating. A part of light receiving element units 231 may detect side scattered light. Here, the side scattered light may be detected by a detector different from the light receiving element unit 231.

Each light receiving element unit 231 has a detection wavelength band longer than the excitation wavelength of the light source 21. For example, when the excitation wavelengths are 320 nm and 355 nm, the detection wavelength band is 360.5 to 843.8 nm, and when the excitation wavelength is 405 nm, the detection wavelength band is 413.6 to 843.8 nm. When the excitation wavelengths are 488 nm, 561 nm, and 638 nm, the detection wavelength band is 492.9 to 843.8 nm, and when the excitation wavelength is 808 nm, the detection wavelength band is 823.5 to 920.0 nm.

A measurement spectrum is acquired from the light of each wavelength band detected by each light receiving element unit 231. A measured value of the side scattered light is also generated from a part of light receiving element units 231. The acquired measurement spectrum is output to the information processing apparatus 100 according to the present embodiment.

The equipment control unit 24 optimizes parameters of the measurement apparatus 20. For example, the equipment control unit 24 optimizes parameters such as conditions of liquid delivery flowing in the flow path of the flow path 22, output of excitation light emitted from the light source 21, and sensitivity with which the photodetector 23 detects fluorescence. The equipment control unit 24 optimizes the parameters according to a calculation result by an information processing unit 132 described later.

The information processing apparatus 100 is an information processing apparatus such as a PC and a work station (WS). The information processing apparatus 100 calculates the fluorescence intensity from each fluorescent dye by mathematically separating the measurement spectrum measured by the measurement apparatus 20 by using the spectrum of each fluorescent dye.

The measurement spectrum according to the embodiment is a spectrum obtained by receiving light generated by irradiating a particle labeled with a plurality of fluorescent dyes having different fluorescence wavelength bands with excitation light by photodetectors having different light receiving wavelength bands and collecting light intensities from each photodetector. In addition, the single staining spectrum according to the embodiment is a spectrum obtained by similarly receiving light obtained by irradiating a particle labeled with a single fluorescent dye with excitation light by photodetectors having different light receiving wavelength bands and collecting light intensities from each photodetector. Therefore, the single staining spectrum indicates distribution of the fluorescence wavelength of each fluorescent dye.

3. Example of Information Processing

3-1. Information Processing Apparatus 100

Figure 6:
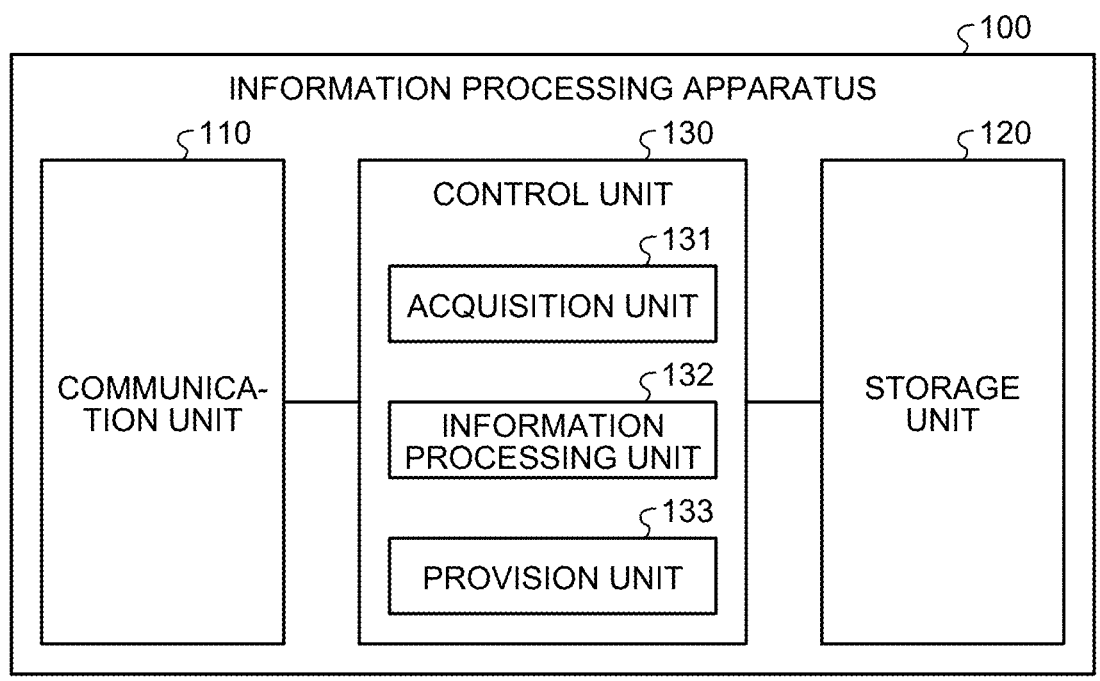
FIG. 6 is a diagram illustrating a configuration example of an information processing apparatus according to an embodiment.

Next, the information processing apparatus 100 according to the embodiment will be described with reference to FIG. 6. FIG. 6 is a diagram illustrating an example of the information processing apparatus 100 according to the embodiment. As illustrated in FIG. 6, the information processing apparatus 100 is a computer including a communication unit 110, a storage unit 120, and a control unit 130.

The communication unit 110 is realized by, for example, a network interface card (NIC) or the like. The communication unit 110 is coupled to a network N (not illustrated) in a wired or wireless manner, and transmits and receives information to and from the measurement apparatus 20 and the like via the network N. The control unit 130 described later transmits and receives information to and from these apparatuses via the communication unit 110.

The storage unit 120 is realized by, for example, a semiconductor memory element such as a random access memory (RAM) or a flash memory, or a storage apparatus such as a hard disk or an optical disk. The storage unit 120 stores the measurement spectrum transmitted from the measurement apparatus 20. In addition, the storage unit 120 stores a single staining spectrum of each fluorescent dye.

The control unit 130 is implemented by, for example, a central processing unit (CPU) or a micro processing unit (MPU) executing a program (an example of an information processing program) stored in the information processing apparatus 100 using a RAM or the like as a work area. Furthermore, the control unit 130 may be executed by, for example, an integrated circuit such as an application specific integrated circuit (ASIC) or a field programmable gate array (FPGA).

As illustrated in FIG. 6, the control unit 130 includes an acquisition unit 131, an information processing unit 132, and a provision unit 133, and realizes or executes a function and an action of information processing described below. Note that an internal configuration of the control unit 130 is not limited to the configuration illustrated in FIG. 6, and may be another configuration as long as information processing to be described later can be executed.

The acquisition unit 131 acquires the measurement spectrum transmitted from the measurement apparatus 20. Specifically, the acquisition unit 131 acquires a measurement spectrum of light obtained by irradiating the particle labeled with the fluorescent dye with excitation light. The measurement spectrum will be described with reference to FIGS. 7A, 7B, 70, 7D, and 8.

Figure 7A:
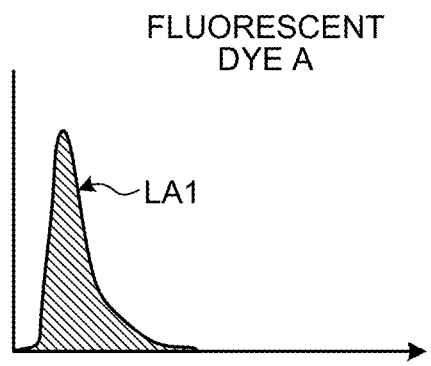
FIGS. 7A, 7B, 7C, and 7D are diagrams illustrating an example of a single staining spectrum according to an embodiment.
Figure 7B:
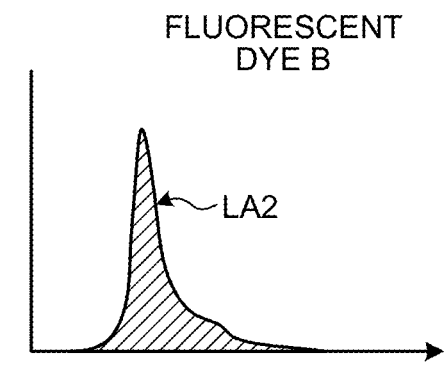
Figure 7C:
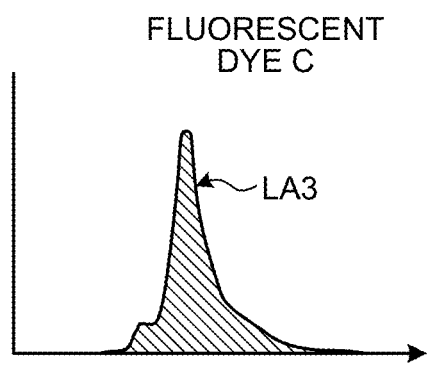
Figure 7D:
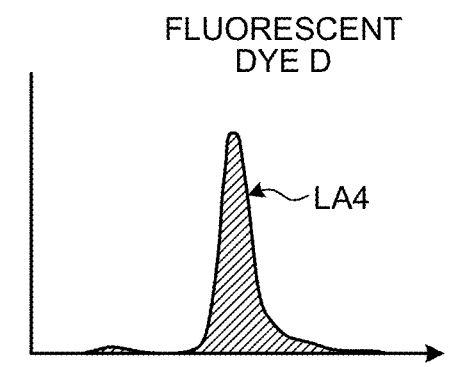

FIGS. 7A, 7B, 7C, and 7D illustrate a single staining spectrum of each fluorescent dye. The acquisition unit 131 acquires the single staining spectrum of a particle labeled with a single fluorescent dye. The plurality of fluorescent dyes labeled the particle illustrated in FIGS. 7A, 7B, 70, and 7D are a fluorescent dye A, a fluorescent dye B, a fluorescent dye C, and a fluorescent dye D. Note that the fluorescent dyes are different from each other. In two-dimensional plots illustrated in of FIGS. 7A, 7B, 7C, and 7D, a vertical axis indicates the fluorescence intensity, and a horizontal axis indicates the number or wavelength of the photodetector. FIG. 7A indicates a single staining spectrum LA1 of the fluorescent dye A labeled the particle. FIG. 7B indicates a single staining spectrum LA2 of the fluorescent dye B labeled the particle. FIG. 7C indicates a single staining spectrum LA3 of the fluorescent dye C labeled the particle. FIG. 7D indicates a single staining spectrum LA4 of the fluorescent dye D labeled the particle. Although the single staining spectrum of each fluorescent dye is used, an autofluorescence spectrum may be included. The autofluorescence spectrum is acquired by irradiating an unstained particle with excitation light. Here, the single staining spectrum may be acquired from the measurement apparatus 20 or may be stored in the storage unit 120 in advance. Furthermore, when the single staining spectrum is stored in advance in the storage unit 120, the single staining spectrum is preferably measured by the same measurement apparatus 20, but may be measured by a different measurement apparatus. In the storage unit 120, a name of each fluorescent dye, a measurement condition at the time of measuring the single staining spectrum, and the like are stored in association with the single staining spectrum.

Figure 8:
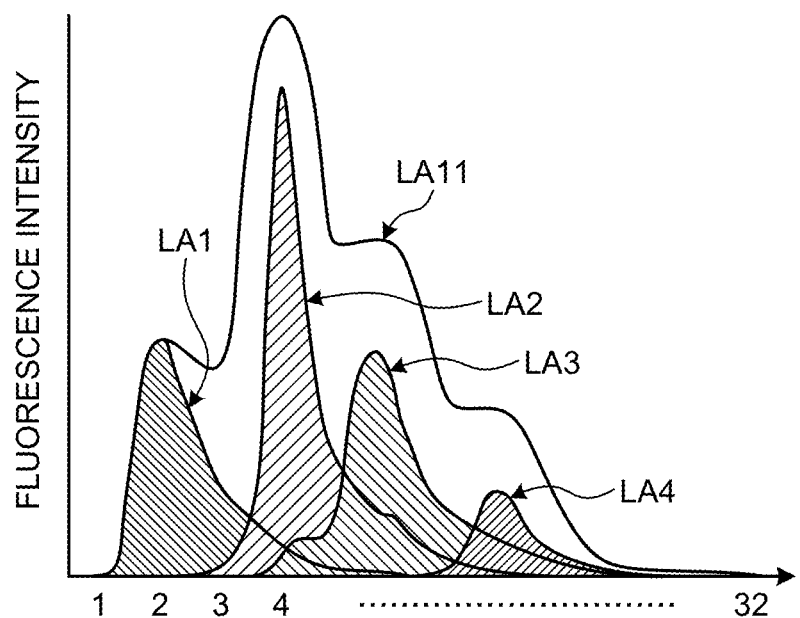
FIG. 8 is a diagram illustrating a relationship between a measurement spectrum and a single staining spectrum.
Figure 10A:
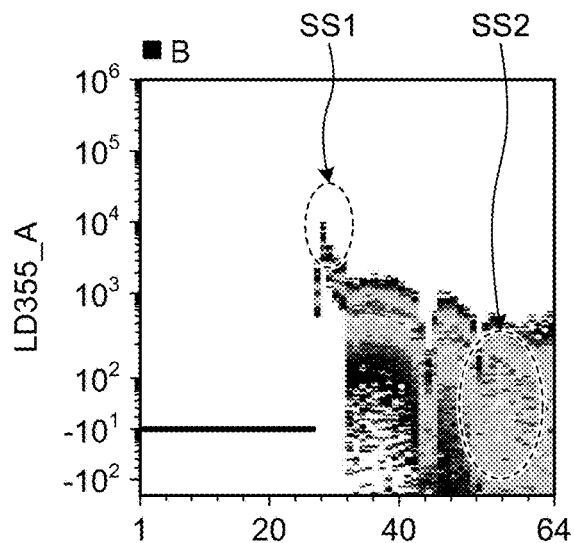
FIGS. 10A, 10B, 10C, 10D, and 10E are diagrams illustrating an example of an area-based variation according to an embodiment.
Figure 10B:
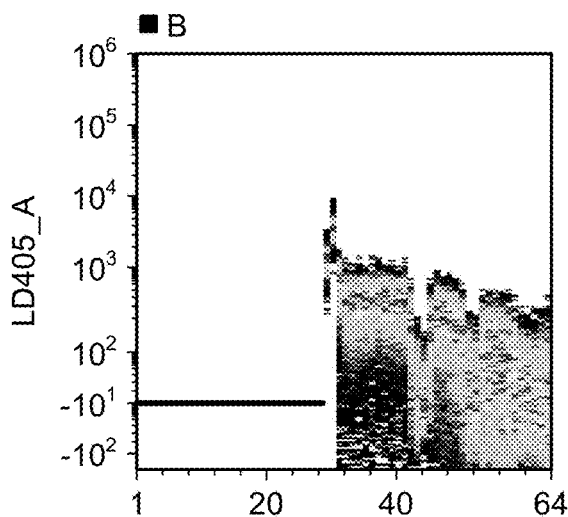
Figure 10C:
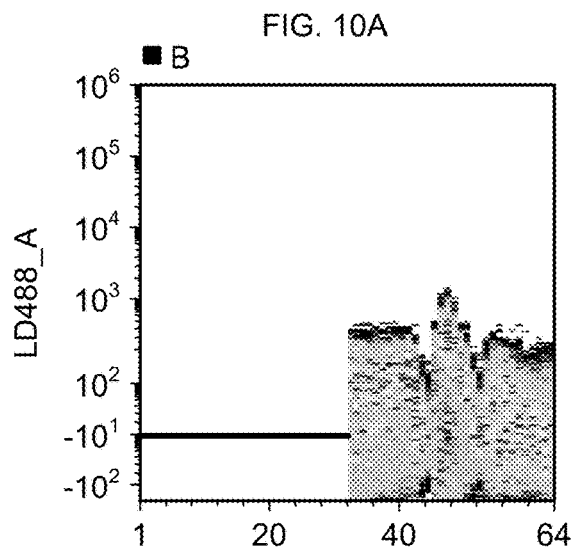
Figure 10D:
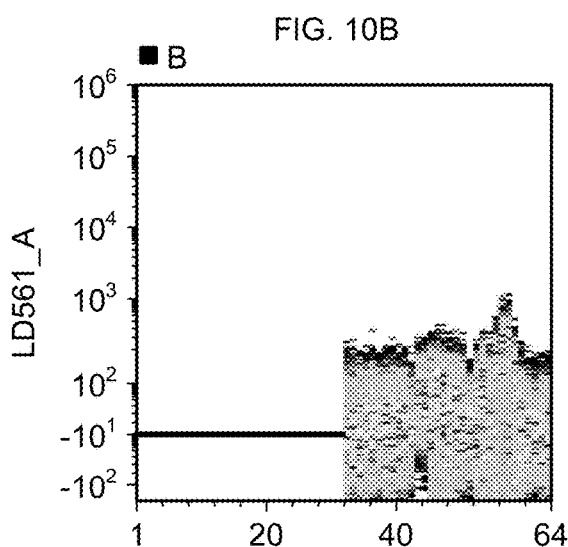
Figure 10E:
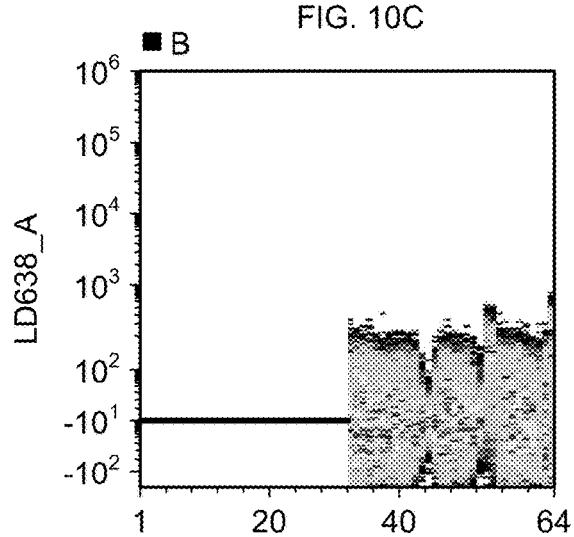
Figure 11A:
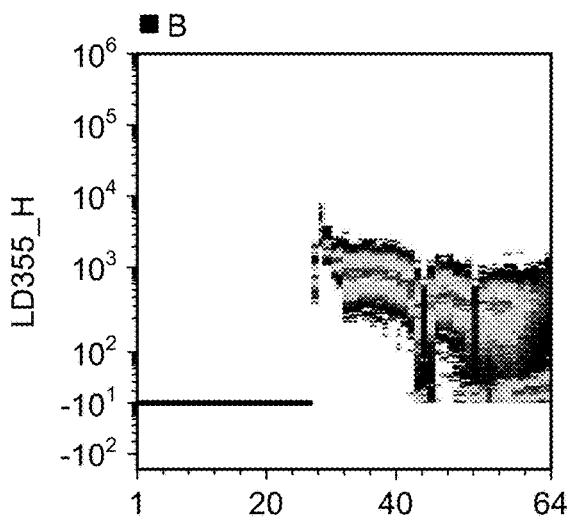
FIGS. 11A, 11B, 11C, 11D, and 11E are diagrams illustrating an example of a height-based variation according to an embodiment.
Figure 11B:
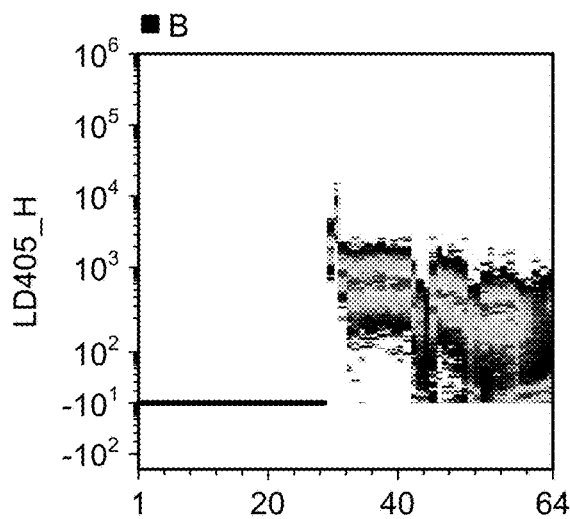
Figure 11C:
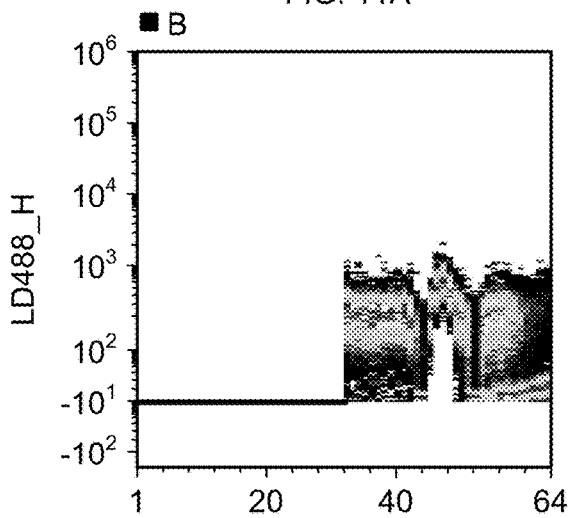
Figure 11D:
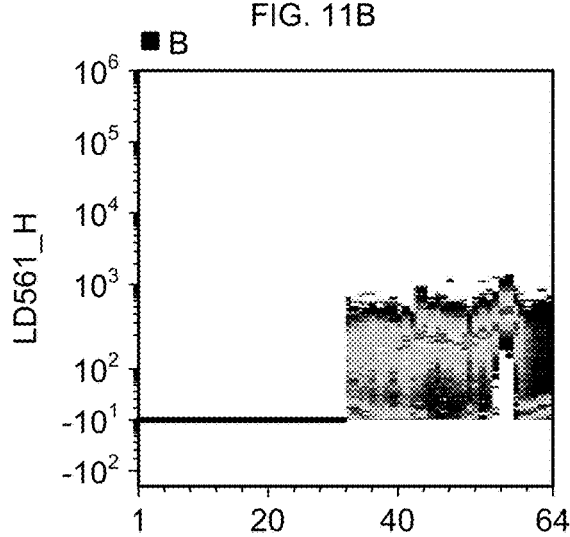
Figure 11E:
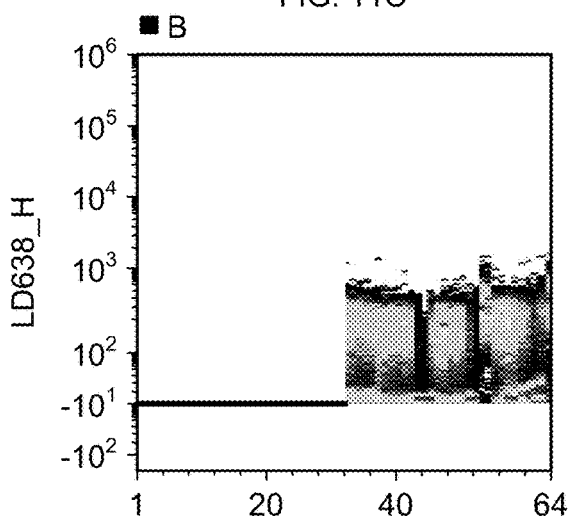

FIG. 8 illustrates a measurement spectrum. A vertical axis of a two-dimensional plot illustrated in FIG. 8 indicates the fluorescence intensity, and a horizontal axis indicates the number or wavelength of the photodetector. The horizontal axis indicates that the number of photodetectors is 32. In FIG. 8, the intensity of light is plotted according to the number of each photodetector. The spectrum indicated by this plot is a measurement spectrum LA11. The acquisition unit 131 acquires the intensity of light corresponding to the number of each photodetector corresponding to the measurement spectrum LA11. The intensity of this light is a measured value. The measurement spectrum LA11 is a spectrum obtained by combining single staining spectra of the fluorescent dyes illustrated in FIGS. 7A, 7B, 7C, and 7D.

The information processing unit 132 separates a measurement spectrum obtained by collecting measured values from each photodetector by a linear sum of single staining spectra obtained with the particle individually labeled with each fluorescent dye. Then, the information processing unit 132 calculates the fluorescence intensity of each fluorescent dye by performing separation processing on the measurement spectrum based on the measured value from each photodetector with the single staining spectrum of each fluorescent dye. Note that, for example, a least squares method (LSM) is used for separation of the measurement spectrum by the linear sum of the single staining spectra. By using this least squares method, separation can be performed so that a fitting rate between the linear sum of the single staining spectra and the measurement spectrum is the highest. Specifically, the information processing unit 132 calculates the fluorescence intensity of each fluorescent dye based on the measurement spectrum and the least squares method, and performs separation based on the calculated fluorescence intensity of each fluorescent dye. The following Formula (1) indicates the LSM.

$$\begin{bmatrix} x_1 \\ \vdots \\ x_n \end{bmatrix} = ([S^T][S])^{-1}[S^T] \begin{bmatrix} y_1 \\ \vdots \\ y_m \end{bmatrix} \quad (1)$$

In the formula, $x_n$ represents the fluorescence intensity of an n-th fluorescent dye. S represents a determinant indicating a shape of the single staining spectrum. $S^T$ represents a transposed determinant of S. In addition, $y_m$ (m=1 to the number of photodetectors) indicates a measured value of an m-th photodetector in the measurement spectrum.

The information processing unit 132 calculates the fluorescence intensity of each fluorescent dye by inputting the measured value acquired by the acquisition unit 131 to Formula (1). However, in the LSM, when the measured value of the photodetector is small, the contribution of the fluorescence incident on the photodetector may be small. Therefore, there is room for further improvement.

Hereinafter, a case where the fluorescence intensity of each fluorescent dye is calculated by using a weighted least square method (WLSM) instead of the LSM will be described. The following Formula (2) indicates the WLSM. Note that the same description as that of the LSM will be appropriately omitted.

$$\begin{bmatrix} x_1 \\ \vdots \\ x_n \end{bmatrix} = ([S^T][L][S])^{-1}[S^T][L]\begin{bmatrix} y_1 \\ \vdots \\ y_m \end{bmatrix} \quad (2)$$

$$L = \begin{bmatrix} \lambda_1 & 0 & 0 \\ 0 & \ddots & 0 \\ 0 & 0 & \lambda_m \end{bmatrix}, \lambda_i = \frac{1}{\max(y_i, 0) + \text{offset}}$$

In the Formula, L represents a determinant indicating the weight of the single staining spectrum. max ($y_i$, 0) represents a larger value of the measured value of an i-th photodetector compared with the measured value of zero. An offset represents a value determined based on the measured value of each photodetector.

Conventionally, for the offset of Formula (2), a constant that maximizes an accuracy of separation experimentally has been used as a fixed value based on an evaluation in a development stage of the measurement apparatus 20. However, as in the case of the LSM, when the measured value of the i-th photodetector is small, contribution of the fluorescence input to the photodetector may be small. Therefore, it is desirable to set the offset to an optimum value for each photodetector.

As indicated in Formula (2), the offset is a value determined for calculating a fluorescence intensity (x) of each fluorescent dye from a measured value (y) of each photodetector in the measurement spectrum. The offset is also a value that can be determined based on a variation or a detection limit specific to each photodetector. The offset is, for example, a weight determined based on a variation in measured values from the respective photodetectors. That is, the separation processing is performed by using a weighted least squares method including a weight determined based on the variation in the measured values from the respective photodetectors.

In order to set the offset to the optimum value for each photodetector, the information processing unit 132 calculates the variation in the measured values of unstained particles for each photodetector. Here, the variation may include, for example, an area (area)-based variation in the measured values of the unstained particles in each of the detectors or a height (peak value)-based variation. Hereinafter, the effects of the WLSM will be described while describing these two types of variations.

The area-based variation is a standard deviation value of the measured value of the unstained particle in each detector. The information processing unit 132 sets the standard deviation value of the measured value of the unstained particle in each detector as the area-based variation. The height-based variation is an average value of measured values of unstained particles in each detector. The information processing unit 132 sets the average value of the measured values of the unstained particles in each detector as the height-based variation.

FIGS. 9A, 9B, 9C, 9D, and 9E illustrate a relationship between the measured value of the unstained particle in each detector and the area-based variation (standard deviation value of the measurement spectrm). The particles illustrated in FIGS. 9A, 9B, 9C, 9D, and 9E are microbeads. A vertical axis of a two-dimensional plot illustrated in FIGS. 9A, 9B, 90, 9D, and 9E indicate a fluorescence intensity, and a horizontal axis indicates the number or wavelength of the photodetector. The horizontal axis indicates that the number of photodetectors is 324. In FIGS. 9A, 9B, 9C, 9D, and 9E, the fluorescence intensity is plotted according to the number of each photodetector. In FIGS. 9A, 9B, 9C, 9D, and 9E, the measured values of the unstained particles and their variations are plotted. A plot indicated by a solid line is a measured value of the unstained particle, and plots indicated by dotted lines are variations. The greater the variation, the less likely the measured value data is reliable. Therefore, in the photodetector having a large variation, the contribution of the fluorescence input to the photodetector is reduced by setting a large offset. For this reason, in order to set the offset to the optimum value for each photodetector, the information processing unit 132 sets the offset having a larger value as the variation in the measured values is larger. Then, the information processing unit 132 calculates the fluorescence intensity of each fluorescent dye by using an offset having a larger value as the variation in the measured values is larger. The same applies to the case of the height, and thus the description thereof will be omitted.

FIGS. 10A, 10B, 10C, 10D, and 10E are diagrams illustrating plots of variations in FIGS. 9A, 9B, 9C, 9D, and 9E in different modes. In FIGS. 10A, 10B, 10C, 10D, and 10E, a degree of variation is displayed in a visible state. A vertical axis of a two-dimensional plot illustrated in FIGS. 10A, 10B, 10C, 10D, and 10E are displayed as a log. For this reason, for example, a variation of SS1 seems to be smaller than a variation of SS2, but actually, the variation of SS1 may be larger. The plots of FIGS. 10A, 10B, 10C, 10D, and 10E correspond to the plots of FIGS. 9A, 9B, 9C, 9D, and 9E, respectively. Specifically, the numbers 0 to 64 of the photodetectors in FIG. 10A correspond to the numbers 0 to 64 of the photodetectors in FIG. 9A. The numbers 65 to 129 of the photodetectors in FIG. 10B correspond to the numbers 0 to 64 of the photodetectors in FIG. 9B. The numbers 130 to 194 of the photodetectors in FIG. 10C correspond to the numbers 0 to 64 of the photodetectors in FIG. 9C. The numbers 195 to 259 of the photodetectors in FIG. 10D correspond to the numbers 0 to 64 of the photodetectors in FIG. 9D. The numbers 260 to 324 of the photodetectors in FIG. 10E correspond to the numbers 0 to 64 of the photodetectors in FIG. 9E.

FIGS. 11A, 11B, 11C, 11D, and 11E are diagrams in which a degree of height-based variation is made visible. The same description as in FIGS. 10A, 10B, 10C, 10D, and 10E will be omitted as appropriate. As an example of an advantage of using the height, when the autofluorescence of the particle is small, the influence of the autofluorescence on the measurement spectrum is also small. Therefore, the height value itself may be a variation. For this reason, the information processing unit 132 can set the average value of the measurement spectra as a variation.

Figures 12A, 12B:
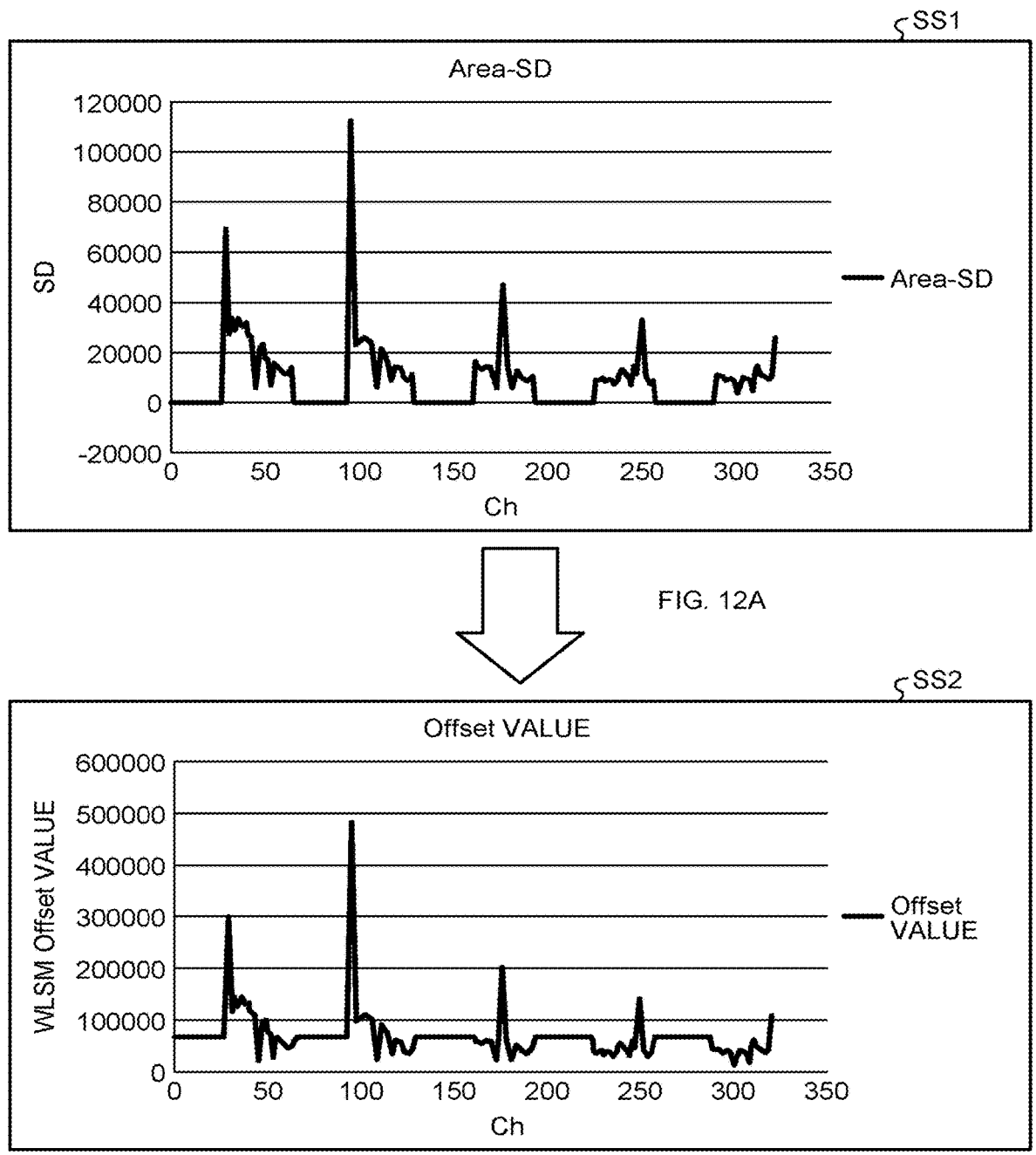
FIGS. 12A and 12B are diagrams illustrating a relationship between an offset and variation according to an embodiment.

Here, a method of calculating the offset will be described. The information processing unit 132 sets a large offset by multiplying the variation in each detector by, for example, a coefficient. FIGS. 12A and 12B illustrate a method of calculating the offset. The plot illustrated in FIG. 12A indicates an area-based variation. Since the plot illustrated in FIG. 12A is similar to the plot illustrated by the dotted line in FIGS. 9A, 9B, 9C, 9D, and 9E, the description of the plot is omitted. The plot illustrated in FIG. 12B indicates the offset. The plot illustrated in FIG. 12B is a plot based on a value obtained by multiplying the plot illustrated in FIG. 12A by a coefficient. Specifically, the plot illustrated in FIG. 12B is a plot based on a value obtained by multiplying the plot illustrated in FIG. 12A by a factor of about 5. For this reason, the information processing unit 132 calculates the offset based on the measured value by the fluorescence of the particle labeled with a plurality of fluorescent dyes. In addition, since there is a possibility that the measured value detected by each photodetector includes a measured value by the autofluorescence of the particle, the information processing unit 132 may calculate the offset based on the measured value by the fluorescence of the particle labeled with a plurality of fluorescent dyes and the measured value by the autofluorescence of the particle.

Figure 13:
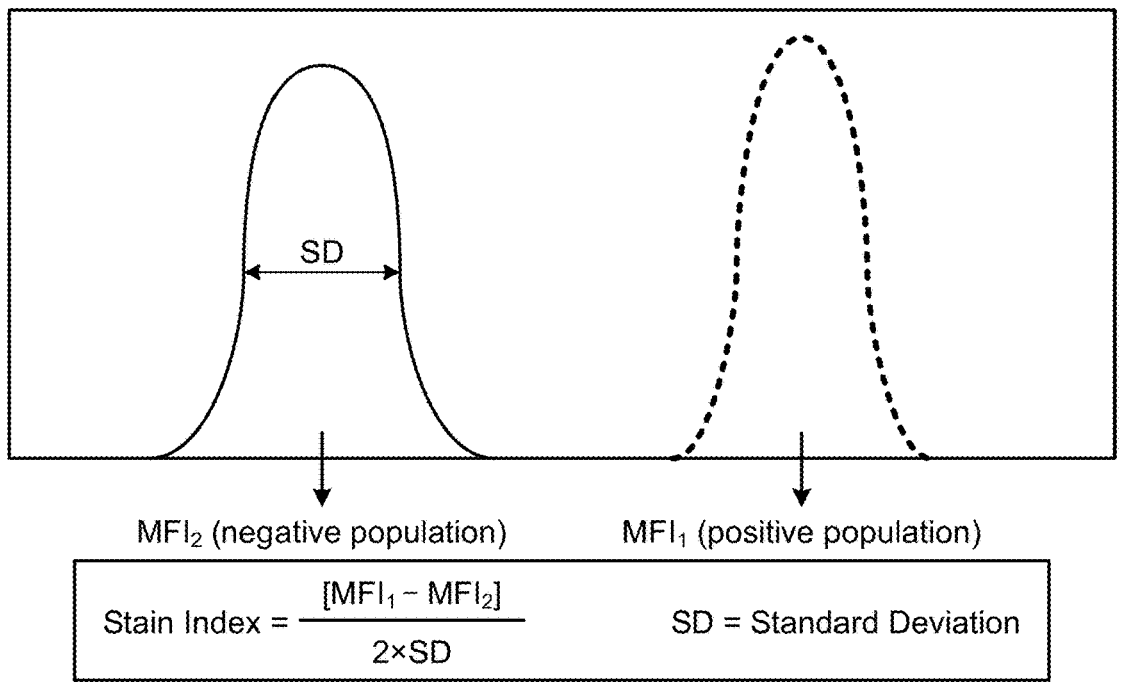
FIG. 13 is a diagram illustrating a calculation formula of a stain index according to an embodiment.

One method for indicating the effect of setting the offset to the optimum value for each photodetector is a stain index. Hereinafter, the stain index will be described. Fluorescence intensity measured varies depending on the nature of the fluorescent dye that labels the same particle. The stain index quantifies the fluorescence intensity by the nature of the fluorescent dye that labels a particular particle. FIG. 13 illustrates a method for calculating the stain index. As illustrated in FIG. 13, the stain index is defined as a value obtained by subtracting a mean fluorescence intensity of a positive population MFI1 from a mean fluorescence intensity of a negative population MFI2, and dividing the obtained value by two times a standard deviation SD of the negative population MFI2. In addition, the distribution of the negative population may vary due to the autofluorescence, non-specific staining, or the like. Since the stain index is also affected by such autofluorescence or non-specific staining as a factor, the fluorescence intensity can be quantified more appropriately.

Figure 14:
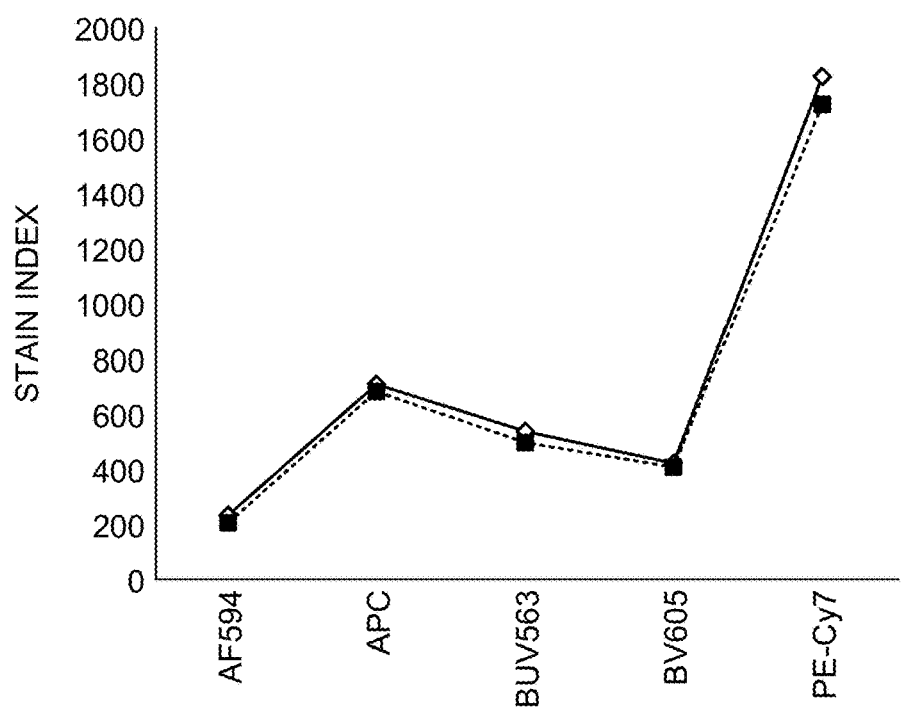
FIG. 14 is a diagram illustrating an example of a stain index according to an embodiment.

FIG. 14 illustrates an effect obtained by setting the offset to an optimum value for each photodetector. A vertical axis of a two-dimensional plot illustrated in FIG. 14 indicates a stain index, and a horizontal axis indicates each fluorescent dye. In FIG. 14, as each fluorescent dye, AF594, APC, BUV563, BV605, and PE-Cy7 are used. The information processing unit 132 calculates the stain index with the particles stained by using each of these fluorescent elements as a positive population and the unstained particles as a negative population. In FIG. 14, the stain index corresponding to each fluorescent dye is plotted. In FIG. 14, the stain index when the offset is set to the optimum value for each photodetector and the stain index when the offset is set to a fixed value are plotted. A plot indicated by a solid line is the stain index when the offset is set to the optimum value for each photodetector, and a plot indicated by a dotted line is the stain index when the offset is set to the fixed value. Here, the larger the stain index, the larger a difference between the positive population and the negative population, and thus a separation performance is improved. Therefore, the information processing unit 132 can separate the measurement spectrum with high accuracy.

Figure 15:
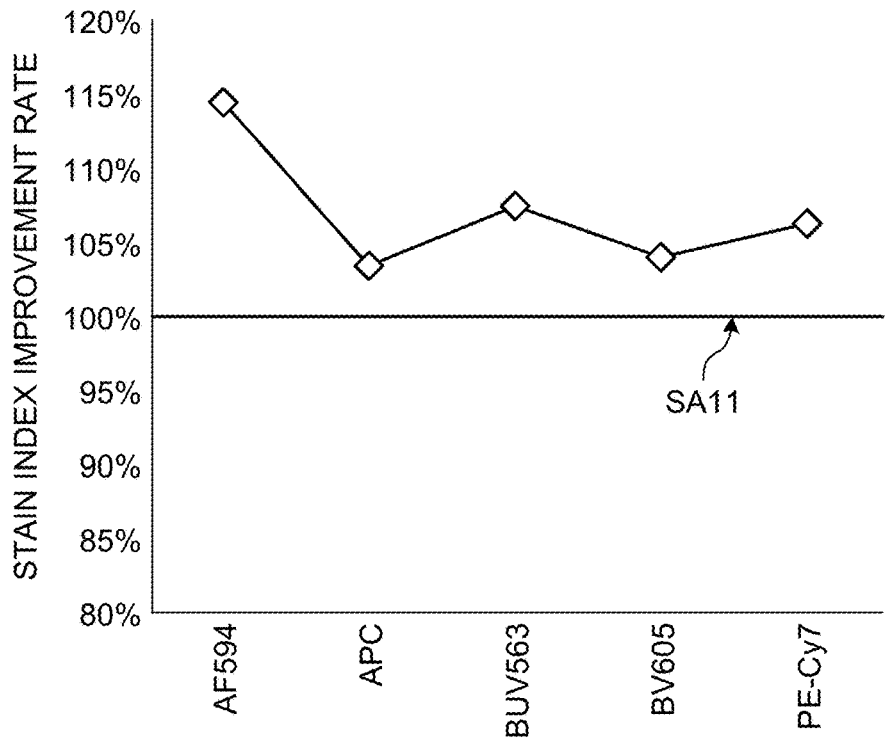
FIG. 15 is a diagram illustrating an example of a stain index improvement rate according to an embodiment.

FIG. 15 is a diagram illustrating FIG. 14 in a different mode. Therefore, the description similar to that of FIG. 14 is omitted. In FIG. 15, a proportion (improvement rate) of a value obtained by dividing the stain index when the offset is set to the optimum value for each photodetector by the stain index when the offset is set to the fixed value is plotted. A vertical axis of the two-dimensional plot illustrated in FIG. 15 indicates an improvement rate, and a horizontal axis indicates each fluorescent dye. SA11 indicates a 100% improvement rate. As illustrated in FIG. 15, the improvement rate exceeds 100% for all the fluorescent dyes.

The provision unit 133 provides information related to the fluorescence intensity of each fluorescent dye calculated by the information processing unit 132. Furthermore, the storage unit 120 stores information related to the fluorescence intensity of each fluorescent dye calculated by the information processing unit 132. The display apparatus 10 displays the information related to the fluorescence intensity provided from the provision unit 133. As a result, the user can appropriately grasp the fluorescence intensity of each fluorescent dye. Here, the display apparatus 10 displays a histogram, a two-dimensional plot, a three-dimensional plot, a spectral plot, a tree plot, a t-SNE plot, and the like based on the calculated fluorescence intensity of each fluorescent dye.

3-2. Processing Procedure

Figure 16:
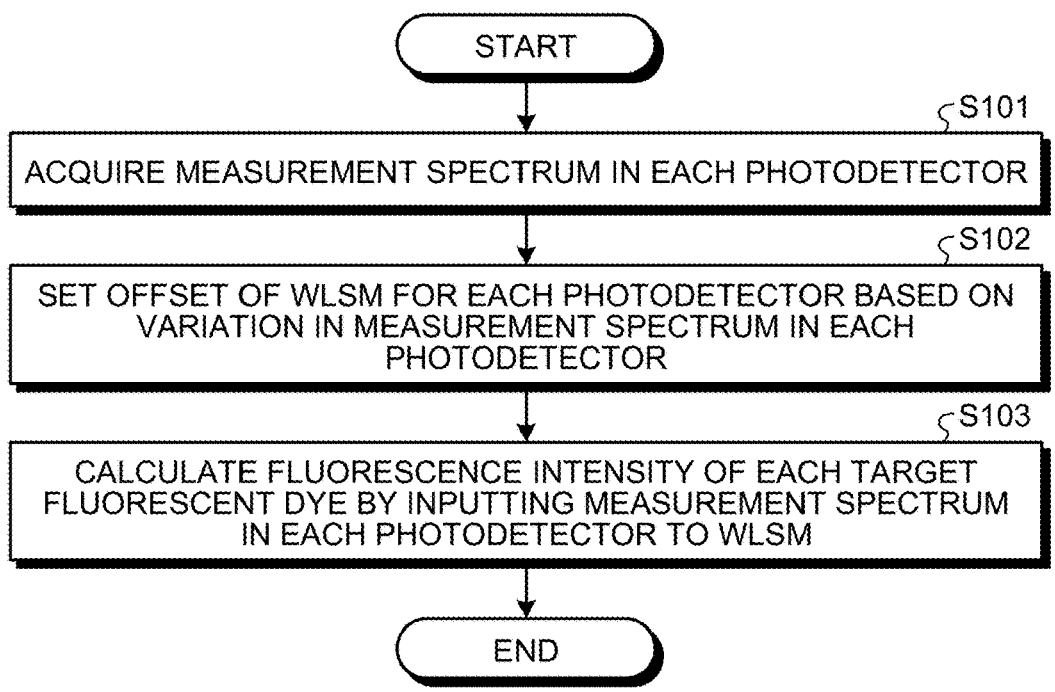
FIG. 16 is a flowchart illustrating a processing procedure according to an embodiment.

Next, a processing procedure according to the embodiment will be described with reference to FIG. 16. FIG. 16 is a flowchart indicating a processing procedure according to the embodiment. As illustrated in FIG. 16, the information processing apparatus 100 acquires a measured value of the unstained particle in each photodetector (step S101).

In addition, the information processing apparatus 100 sets an offset of a WLSM for each photodetector based on a variation in the measured values of the unstained particles in each photodetector (step S102). Subsequently, the information processing apparatus 100 calculates a fluorescence intensity of each target fluorescent dye by inputting a measurement spectrum in each photodetector and a single staining spectrum to the WLSM (step S103). Here, the measurement spectrum is measured by the measurement apparatus 20 from the particle labeled with the fluorescent dye. The measured value of the unstained particle is also measured by the measurement apparatus 20, but the measured values or the variation in the unstained particles can be stored in the storage unit 120 in advance before the acquisition of the measurement spectrum. The fluorescence intensity of each fluorescent dye can also be calculated by using the variation in the unstained particles stored in the storage unit 120.

4. Modifications

In the above-described WLSM, since max $(y_i, 0)$ and the offset are calculated for each measurement data, the processing may take time. Hereinafter, processing in a case where the processing time needs to be shorter than that of the above-described WLSM will be described. An example of such a case is a case where a cell sorter is used.

The cell sorter is an apparatus (sorter) that sorts particles emitting specific fluorescence by controlling a movement destination of the particles based on fluorescence information detected by a flow cytometer. In a sorting apparatus such as a cell sorter, it may be required to perform processing of measuring and analyzing flowing particles and determining whether to sort the particles based on the measurement and analysis results within a limited time during which the particles flow in the apparatus. Therefore, in the sorting apparatus such as a cell sorter, it is desirable to determine whether a particle is a sorting target more quickly and in real time.

A sorter sorts a part of particles to be sorted. Specifically, first, the sorter generates droplets for sorting, and charges the droplets of particles to be sorted. Next, the sorter moves the generated droplets into an electric field generated by a deflection plate. At this time, since the charged droplets are attracted toward the charged polarizing plate, a moving direction of the droplets is changed. As a result, the sorter can separate a droplet of a particle to be sorted and a droplet of a particle not to be sorted, so that the particle to be sorted can be sorted. A sorting method of the sorter may be either a jet-in-air method or a cuvette flow cell method. In addition, the particles may be sorted by being ejected to an outside of a flow cell or a microchip, or may be sorted inside the microchip. Whether to sort the particles may be determined by a logic circuit (for example, a field-programmable gate array (FPGA) circuit) provided in the sorting apparatus, or may be determined by an instruction from the information processing apparatus 100.

The user confirms the information related to the fluorescence intensity based on a table such as a two-dimensional plot on the display apparatus 10, and specifies a region including particles to be sorted. The information processing apparatus 100 determines a condition for sorting determination based on the information related to the region including the particles to be sorted specified by the user, and stores the condition in the storage unit 120. The information processing unit 132 performs separation processing on the measurement spectrum based on the detection value acquired by the photodetector. The information processing apparatus 100 specifies particles to be sorted by comparing the fluorescence intensity acquired by the separation processing with the condition of the sorting determination, and outputs a sorting instruction to the sorter. Here, the sorting determination may be performed by using a machine learning algorithm such as a neural network. In this case, the machine learning algorithm is supervised learning in which information related to a measurement spectrum of a particle to be sorted specified by the user is used as a teacher. For example, a learning model may be constructed by using a machine learning algorithm such as random forest, support vector machine, and deep learning.

Hereinafter, a case where the fluorescence intensity of each fluorescent dye is calculated by using the WLSM (hereinafter, it is appropriately referred to as "noise base WLSM") excluding a calculation term of max ($y_i$, 0) in the above-described WLSM will be described. The following Formula (3) indicates the noise base WLSM. Note that the description similar to that of the WLSM or the LSM will be omitted as appropriate.

$$\begin{bmatrix} x_1 \\ \vdots \\ x_n \end{bmatrix} = ([S^T][L][S])^{-1} [S^T][L] \begin{bmatrix} y_1 \\ \vdots \\ y_m \end{bmatrix} \quad (3)$$

$$L = \begin{bmatrix} \lambda_1 & 0 & 0 \\ 0 & \ddots & 0 \\ 0 & 0 & \lambda_m \end{bmatrix}, \lambda_i = \frac{1}{\text{offset}}$$

A difference between the WLSM and the noise base WLSM is whether there is a max ($y_i$, 0) term. In the noise base WLSM, since there is no max ($y_i$, 0) term, the processing time may be shorter than that of the WLSM. As a result, the information processing unit 132 can quickly calculate the fluorescence intensity of each fluorescent dye by using the noise base WLSM.

Figure 17:
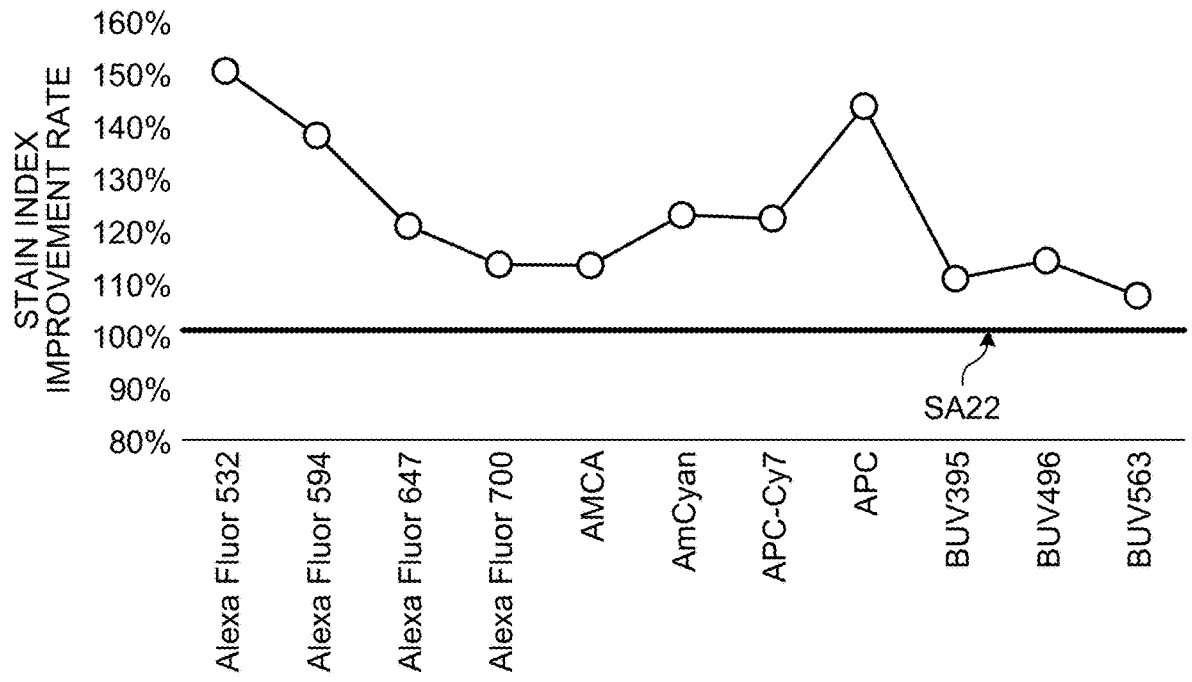
FIG. 17 is a diagram illustrating an example of a stain index improvement rate according to an embodiment.

FIG. 17 illustrates a difference between the results in the case of using the noise base WLSM and the case of using the LSM. In FIG. 17, the proportion (improvement rate) of the value obtained by dividing the stain index in the case of using the noise base WLSM by the stain index in the case of using the LSM is plotted. A vertical axis of a two-dimensional plot illustrated in FIG. 17 indicates the improvement rate, and a horizontal axis indicates each fluorescent dye.

Note that SA22 indicates a 100% improvement rate. As illustrated in FIG. 17, the improvement rate exceeds 100% for all the fluorescent dyes. The information processing unit 132 can calculate the fluorescence intensity of each fluorescent dye with higher accuracy than the LSM by using the noise base WLSM.

5. Variations of Processing

5-1. Application to WSI

In the above-described embodiment, the spectral-type flow cytometer has been exemplified, but the technique according to the present disclosure is not limited to the flow cytometer, and can also be applied to medical equipment such as hall slide imaging (WSI).

In the hall slide imaging (WSI), a specimen to be measured is placed on a stage, and the specimen placed on the stage is scanned with excitation light from a light source. In addition, in the hall slide imaging (WSI), a two-dimensional imager such as a line sensor in which pixels are linearly arranged is used as a photodetector. The line sensor generates two-dimensional or three-dimensional image data (spectral image) for the entire specimen by receiving fluorescence emitted from the specimen when the excitation light scans the specimen on the stage.

The generated spectrum image is input to the information processing apparatus 100, separation processing is performed, and a fluorescence intensity of each fluorescent dye is acquired, similarly to the above-described embodiment.

The specimen is typically composed of a slide including an observation target such as a tissue section, but it is needless to say that the specimen may be other slides. The specimen is stained with a plurality of fluorescent dyes. The light source includes a plurality of line illuminations corresponding to the excitation wavelengths of the fluorescent dyes, and a wavelength configuring a first line illumination and a wavelength configuring a second line illumination are different from each other. A linear fluorescence excited by the line illumination is observed in the photodetector through an optical system.

The photodetector includes an observation slit having a plurality of slits through which fluorescences excited by a plurality of line illuminations can pass, and at least one imaging element capable of individually receiving the fluorescence that has passed through the observation slit. As the imaging element, a two-dimensional imager such as a charge coupled device (CCD) and a complementary metal oxide semiconductor (CMOS) is adopted.

The photodetector acquires spectral data (x, $\lambda$) of fluorescence by using a pixel array in one direction (for example, a vertical direction) of the imaging element as a wavelength channel from each line illumination. The obtained spectral data (x, $\lambda$) is recorded in the information processing apparatus 100 in a state in which spectral data excited from which excitation wavelength is associated with each other.

The information processing unit 132 separates and calculates intensity distributions of the autofluorescence of the specimen and the fluorescent dye from the photographed spectral data (measurement spectrum) based on each standard spectrum of the autofluorescence of the specimen and the single dye stored in advance in the storage unit 120. The calculated intensity distribution is stored in the storage unit 120, output to the display apparatus 10, and displayed as an image.

As described above, also for the WSI, it is possible to acquire the intensity distributions of the autofluorescence of the specimen and the fluorescent dye similarly to the spectral-type flow cytometer.

5-2. Measurement of Various Spectra

In the above embodiment, an example has been described in which the spectrum of the fluorescence emitted from the fluorescent dye is acquired as the measurement spectrum, but the present disclosure is not limited to this example. The information processing apparatus 100 may acquire any light as a measurement spectrum as long as the light is light emitted from a fluorescent dye. For example, the information processing apparatus 100 may acquire a spectrum of phosphorescence emitted by a fluorescent dye or a spectrum of scattered light as a measurement spectrum. In this case, the information processing apparatus 100 calculates the fluorescence intensity of the phosphorescence or the scattered light by separating the measurement spectrum obtained by collecting the measured values of the phosphorescence or the scattered light from the respective photodetectors.

5-3. Spectral Object Other than Prism

In the above embodiment, an example has been described in which the measurement apparatus 20 disperses the fluorescence generated from the fluorescent dye by using the prism, but the present disclosure is not limited to this example. As the measurement apparatus 20, any apparatus may be used as long as the apparatus can disperse the fluorescence generated from the fluorescent dye. For example, the measurement apparatus 20 may disperse the fluorescence generated from the fluorescent dye by using a diffraction grating.

5-4. Integral of Apparatus

In the above embodiment, an example has been described in which the measurement apparatus 20 and the information processing apparatus 100 are separate apparatuses, but the measurement apparatus 20 and the information processing apparatus 100 may be integrated. For example, the function of the information processing apparatus 100 may be implemented by a computer that controls the operation of the measurement apparatus 20. Furthermore, the function of the information processing apparatus 100 may be implemented by any computer provided in a housing of the measurement apparatus 20.

5-5. Other Signals

The measured value according to the embodiment and the spectrum obtained by collecting the measured values may also include signals other than the light emitted by the fluorescent dye and a signal due to the autofluorescence of the particle. For example, the measured value according to the embodiment and the spectrum obtained by collecting the measured values may include a signal of noise by the measurement apparatus 20, a signal by Raman shift of excitation light, and the like.

6. Hardware Configuration

Figure 18:
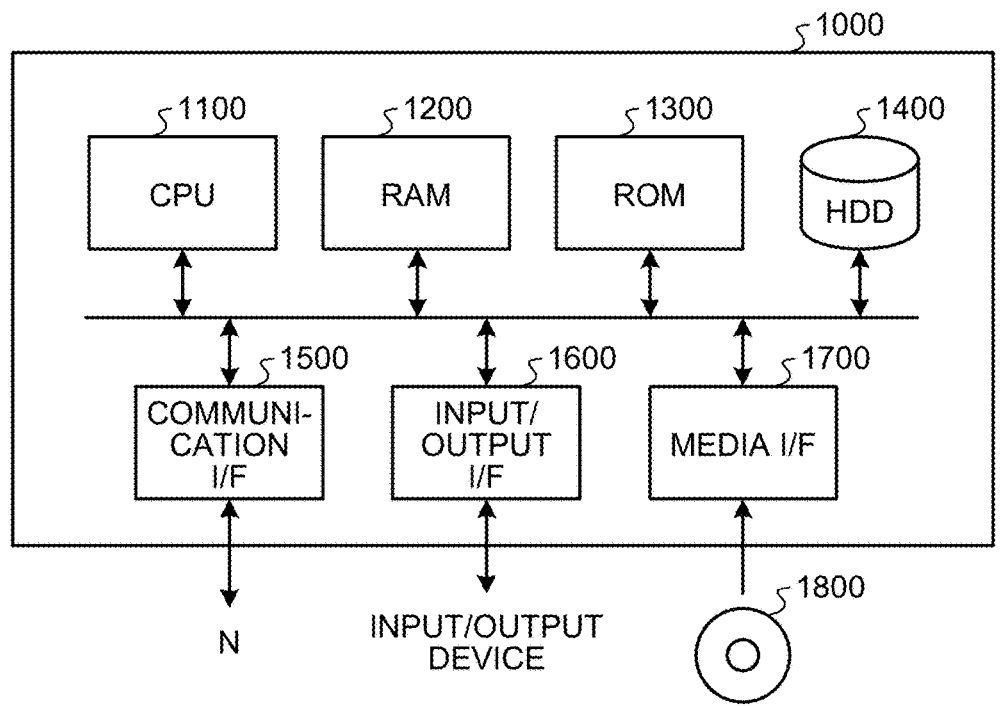
FIG. 18 is a hardware configuration diagram illustrating an example of a computer that implements functions of an information processing apparatus.

Furthermore, the information processing apparatus 100 and the measurement apparatus 20 according to the above-described embodiments are implemented by, for example, a computer 1000 having a configuration as illustrated in FIG. 18. FIG. 18 is a hardware configuration diagram illustrating an example of a computer that implements the functions of the information processing apparatus 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400, and controls each unit. The ROM 1300 stores a boot program executed by the CPU 1100 when the computer 1000 is started, a program that depends on hardware of the computer 1000, and the like.

The HDD 1400 stores a program executed by the CPU 1100, data used by the program, and the like. The communication interface 1500 receives data from another equipment via a predetermined communication network, sends the data to the CPU 1100, and transmits data generated by the CPU 1100 to another equipment via a predetermined communication network.

The CPU 1100 controls an output apparatus such as a display or a printer and an input apparatus such as a keyboard and a mouse via the input/output interface 1600. The CPU 1100 acquires data from the input apparatus via the input/output interface 1600. In addition, the CPU 1100 outputs the generated data to the output apparatus via the input/output interface 1600.

The media interface 1700 reads a program or data stored in the recording medium 1800 and provides the program or data to the CPU 1100 via the RAM 1200. The CPU 1100 loads the program from the recording medium 1800 onto the RAM 1200 via the media interface 1700, and executes the loaded program. The recording medium 1800 is, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, and the like.

For example, in a case where the computer 1000 functions as the information processing apparatus 100 according to the embodiment, the CPU 1100 of the computer 1000 executes the program loaded on the RAM 1200 to implement the functions of the acquisition unit 131, the information processing unit 132, the provision unit 133, and the like. The CPU 1100 of the computer 1000 reads and executes these programs from the recording medium 1800, but as another example, these programs may be acquired from another apparatus via a predetermined communication network. In addition, the HDD 1400 stores a particle analysis program according to the present disclosure and data in the storage unit 120.

7. Others

In addition, among the processing described in the above embodiments and modifications, all or a part of the processing described as being automatically performed can be manually performed, or all or a part of the processing described as being manually performed can be automatically performed by a known method. In addition, the processing procedure, specific name, and various types of information including data and parameters indicated in the specification and the drawings can be arbitrarily changed unless otherwise specified. For example, the various types of information indicated in each drawing are not limited to the illustrated information.

In addition, each component of each apparatus illustrated in the drawings is functionally conceptual, and is not necessarily physically configured as illustrated in the drawings. That is, a specific form of distribution and integration of each apparatus is not limited to the illustrated form, and all or a part thereof can be functionally or physically distributed and integrated in an arbitrary unit according to various loads, usage conditions, and the like.

In addition, the above-described embodiments and modifications can be appropriately combined within a range that does not contradict processing contents.

Although some of the embodiments of the present application have been described in detail with reference to the drawings, these are merely examples, and the present invention can be implemented in other forms subjected to various modifications and improvements based on the knowledge of those skilled in the art, including the modes described in the disclosure of the invention.

In addition, the "part (section, module, and unit)" described above can be read as "means", "circuit", or the like. For example, the acquisition unit can be replaced with acquisition means or an acquisition circuit.

Note that the present technique can also have the following configurations.

(1)

A particle analysis system including:

a plurality of photodetectors configured to acquire light generated by irradiating a particle labeled with a plurality of fluorescent dyes with excitation light; and an information processing unit configured to calculate fluorescence intensity of each fluorescent dye by performing separation processing on a measurement spectrum based on measured values from the plurality of photodetectors with a single staining spectrum of each fluorescent dye, wherein the separation processing is performed by using a weighted least squares method (WLSM) including a weight determined based on a variation in the measured values.

(2)

The particle analysis system according to (1), wherein the information processing unit calculates the fluorescence intensity by using an evaluation function represented by the following Formula (4)

$$\begin{bmatrix} x_1 \\ \vdots \\ x_n \end{bmatrix} = \left([S^T][L][S]\right)^{-1}[S^T][L]\begin{bmatrix} y_1 \\ \vdots \\ y_m \end{bmatrix} \quad (4)$$

$$L = \begin{bmatrix} \lambda_1 & 0 & 0 \\ 0 & \ddots & 0 \\ 0 & 0 & \lambda_m \end{bmatrix}, \lambda_i = \frac{1}{\max(y_i, 0) + \text{offset}}$$

in the formula, S represents a determinant indicating a shape of the single staining spectrum, $S^T$ represents a transposed determinant of S, L represents a determinant indicating the weight of the single staining spectrum, $X_n$ (n=1 to the number of fluorescent dyes) represents a fluorescence intensity of an n-th fluorescent dye, $y_m$ (m=1 to the number of photodetectors) represents a measured value of an m-th photodetector, max ($y_i$, 0) represents a larger value of a measured value of an i-th photodetector and a measured value of zero, and an offset represents a value of a weight determined based on a measured value of each photodetector.

(3)

The particle analysis system according to (1), wherein the information processing unit calculates the fluorescence intensity by using an evaluation function represented by the following Formula (5)

$$\begin{bmatrix} x_1 \\ \vdots \\ x_n \end{bmatrix} = \left([S^T][L][S]\right)^{-1}[S^T][L]\begin{bmatrix} y_1 \\ \vdots \\ y_m \end{bmatrix} \quad (5)$$

-continued $$L = \begin{bmatrix} \lambda_1 & 0 & 0 \\ 0 & \ddots & 0 \\ 0 & 0 & \lambda_m \end{bmatrix}, \lambda_i = \frac{1}{\text{offset}}$$

in the formula, S represents a determinant indicating a shape of the single staining spectrum, $S^T$ represents a transposed determinant of S, L represents a determinant indicating the weight of the single staining spectrum, $X_n$ (n=1 to the number of fluorescent dyes) represents a fluorescence intensity of an n-th fluorescent dye, $y_m$ (m=1 to the number of photodetectors) represents a measured value of an m-th photodetector, and an offset represents a value of a weight determined based on a measured value of each photodetector.

(4)

The particle analysis system according to any one of (1) to (3), wherein the weight is a value calculated based on a measured value by autofluorescence of the particle detected by each photodetector.

(5)

The particle analysis system according to any one of (1) to (4), wherein the weight is a value calculated based on a measured value by autofluorescence of the particle detected by each photodetector and the measured value by fluorescence of the particle labeled with the plurality of fluorescent dyes.

(6)

The particle analysis system according to any one of (1) to (5), wherein the weight is a standard deviation value calculated based on an area obtained by integrating the measured values in each photodetector.

(7)

The particle analysis system according to any one of (1) to (6), wherein the weight is an average value calculated based on a height indicating a peak value of the measured value in each photodetector.

(8)

The particle analysis system according to any one of (1) to (7), further including:

a sorter configured to sort particles that emit specific fluorescence based on a processing result by the information processing unit.

(9)

A particle analysis method including:

acquiring light generated by irradiating a particle labeled with a plurality of fluorescent dyes with excitation light by a plurality of photodetectors; and calculating fluorescence intensity of each fluorescent dye by performing separation processing on a measurement spectrum based on measured values from the plurality of photodetectors with a single staining spectrum of each fluorescent dye, wherein the separation processing is performed by using a weighted least squares method (WLSM) including a weight determined based on a variation in the measured values.

REFERENCE SIGNS LIST

1 PARTICLE ANALYSIS SYSTEM
10 DISPLAY APPARATUS

20 MEASUREMENT APPARATUS
21 LIGHT SOURCE
22 FLOW PATH
23 PHOTODETECTOR
24 EQUIPMENT CONTROL UNIT
100 INFORMATION PROCESSING APPARATUS
110 COMMUNICATION UNIT
120 STORAGE UNIT
130 CONTROL UNIT
131 ACQUISITION UNIT
132 INFORMATION PROCESSING UNIT
133 PROVISION UNIT
230 DETECTOR
231 LIGHT RECEIVING ELEMENT UNIT
N NETWORK

The invention claimed is:

1. A particle analysis system, including comprising:
a light source configured to irradiate a particle with excitation light, wherein the particle is labeled with a plurality of fluorescent dyes;
a plurality of photodetectors configured to acquire irradiation light based on the irradiation of the particle; and
an information processing unit configured to:
determine a variation in a plurality of measured values of each of the plurality of photodetectors;
perform a separation process on a measurement spectrum, based on the plurality of measured values and a weighted least squares method (WLSM), wherein the WLSM includes a weight,
the weight is based on the variation in the plurality of measured values, and
the plurality of measured values is based on a single staining spectrum of each of the plurality of fluorescent dyes; and
calculate fluorescence intensity of each of the plurality of fluorescent dyes based on the separation process on the measurement spectrum.

2. The particle analysis system according to claim 1, wherein the information processing unit is further configured to calculate the fluorescence intensity based on an evaluation function represented by the following Formula (1)

$$\begin{bmatrix} x_1 \\ \vdots \\ x_n \end{bmatrix} = ([S^T][L][S])^{-1}[S^T][L] \begin{bmatrix} y_1 \\ \vdots \\ y_m \end{bmatrix} \quad (1)$$

in the formula, S represents a determinant indicating a shape of the single staining spectrum, $S^T$ represents a transposed determinant of S, $x_n$ (n=1 to a number of fluorescent dyes) represents the fluorescence intensity of an n-th fluorescent dye, $y_m$ (m=1 to the number of photodetectors) represents a measured value of an m-th photodetector.

3. The particle analysis system according to claim 1, wherein the information processing unit is further configured to calculate the fluorescence intensity based on an evaluation function represented by the following Formula (2)

$$\begin{bmatrix} x_1 \\ \vdots \\ x_n \end{bmatrix} = ([S^T][L][S])^{-1}[S^T][L] \begin{bmatrix} y_1 \\ \vdots \\ y_m \end{bmatrix} \quad (2)$$

-continued $$L = \begin{bmatrix} \lambda_1 & 0 & 0 \\ 0 & \ddots & 0 \\ 0 & 0 & \lambda_m \end{bmatrix}, \lambda_i = \frac{1}{\max(y_i, 0) + \text{offset}}$$

in the formula, S represents a determinant indicating a shape of the single staining spectrum, $S^T$ represents a transposed determinant of S, L represents a determinant indicating the weight of the single staining spectrum, $x_n$ (n=1 to a number of fluorescent dyes) represents the fluorescence intensity of an n-th fluorescent dye, $y_m$ (m=1 to the number of photodetectors) represents a measured value of an m-th photodetector, max ($y_i$, 0) represents a larger value of a measured value of an i-th photodetector and a measured value of zero, and an offset represents a value of the weight.

4. The particle analysis system according to claim 1, wherein the weight is a value calculated based on a measured value by autofluorescence of the particle detected by each of the plurality of photodetectors.

5. The particle analysis system according to claim 1, wherein the weight is a value calculated based on a measured value by autofluorescence of the particle detected by each of the plurality of photodetectors and a measured value, of the plurality of measured values, by fluorescence of the particle labeled with the plurality of fluorescent dyes.

6. The particle analysis system according to claim 1, wherein the weight is a standard deviation value calculated based on an area obtained by integration of each of the plurality of measured values in each of the plurality of photodetectors.

7. The particle analysis system according to claim 1, wherein the weight is an average value calculated based on a height indicating a peak value of a measured value, of the plurality of measured values, in each of the plurality of photodetectors.

8. The particle analysis system according to claim 1, further comprising:
a sorter configured to sort particles that emit predetermined fluorescence based on a processing result by the information processing unit.

9. A particle analysis method, comprising:
irradiating a particle with excitation light, wherein the particle is labeled with a plurality of fluorescent dyes;
acquiring irradiation light based on the irradiation of the particle;
determining a variation in a plurality of measured values of each of a plurality of photodetectors;
performing separation processing on a measurement spectrum, based on the plurality of measured values and a weighted least squares method (WLSM), wherein the WLSM includes a weight,
the weight is based on the variation in the plurality of measured values, and
the plurality of measured values is based on a single staining spectrum of each of the plurality of fluorescent dyes; and
calculating fluorescence intensity of each of the plurality of fluorescent dyes based on the separation processing on the measurement spectrum.

* * * * *